United States Patent
Abe et al.

(10) Patent No.: US 10,472,518 B2
(45) Date of Patent: Nov. 12, 2019

(54) METHOD FOR PRODUCING POLYCARBONATE-POLYORGANOSILOXANE COPOLYMER

(71) Applicant: IDEMITSU KOSAN CO., LTD., Tokyo (JP)

(72) Inventors: Tomoko Abe, Ichihara (JP); Yasuhiro Ishikawa, Ichihara (JP); Yohei Koori, Ichihara (JP); Masaru Nakagawa, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 71 days.

(21) Appl. No.: 15/754,776

(22) PCT Filed: Aug. 29, 2016

(86) PCT No.: PCT/JP2016/075202
§ 371 (c)(1),
(2) Date: Feb. 23, 2018

(87) PCT Pub. No.: WO2017/034040
PCT Pub. Date: Mar. 2, 2017

(65) Prior Publication Data
US 2018/0251636 A1 Sep. 6, 2018

(30) Foreign Application Priority Data
Aug. 27, 2015 (JP) .................. 2015-167756

(51) Int. Cl.
| | | |
|---|---|---|
| C08G 63/02 | (2006.01) | |
| C08L 83/10 | (2006.01) | |
| C08G 81/00 | (2006.01) | |
| C08G 64/08 | (2006.01) | |
| C08L 69/00 | (2006.01) | |
| C08G 64/18 | (2006.01) | |
| C08G 64/24 | (2006.01) | |
| C08G 77/08 | (2006.01) | |
| C08G 77/448 | (2006.01) | |

(52) U.S. Cl.
CPC ............. *C08L 83/10* (2013.01); *C08G 64/08* (2013.01); *C08G 64/186* (2013.01); *C08G 64/24* (2013.01); *C08G 81/00* (2013.01); *C08L 69/00* (2013.01); *C08G 77/08* (2013.01); *C08G 77/448* (2013.01)

(58) Field of Classification Search
USPC .................................................. 528/196, 198
See application file for complete search history.

(56) References Cited

FOREIGN PATENT DOCUMENTS

| | | |
|---|---|---|
| EP | 2 896 655 A1 | 7/2015 |
| JP | H05-140461 A | 6/1993 |
| JP | H06-100684 A | 4/1994 |
| JP | 3334732 B2 | 10/2002 |
| JP | 2006-188651 A | 7/2006 |
| JP | 2008-208151 A | 9/2008 |
| WO | WO-2011/071128 A1 | 6/2011 |
| WO | WO-2013/058214 A1 | 4/2013 |
| WO | WO-2014/007128 A1 | 1/2014 |

OTHER PUBLICATIONS

Extended European Search Report dated Mar. 19, 2019 in corresponding application No. 16839387.
International Searching Authority, "International Search Report," issued in connection with International Patent Application No. PCT/JP2016/075202, dated Sep. 20, 2016.
Internatioal Searching Authority, "Written Opinion," issued in connection with International Patent Application No. PCT/JP2016/075202, dated Sep. 20, 2016.

*Primary Examiner* — Terressa Boykin
(74) *Attorney, Agent, or Firm* — Foley & Lardner LLP

(57) ABSTRACT

Provided is a method of producing a polycarbonate-polyorganosiloxane copolymer, including a step (Q) of causing a polycarbonate oligomer and at least one of polyorganosiloxanes represented by the following general formulae (i) to (iii) to react with each other in an organic solvent, in which in the step, a solid content weight x (g/L) of the polycarbonate oligomer in 1 L of a mixed solution of the organic solvent and the polycarbonate oligomer, a concentration y (mass %) of the polyorganosiloxane in the polycarbonate-polyorganosiloxane copolymer to be obtained, and a chain length n of the polyorganosiloxane satisfy specific conditions.

14 Claims, 1 Drawing Sheet

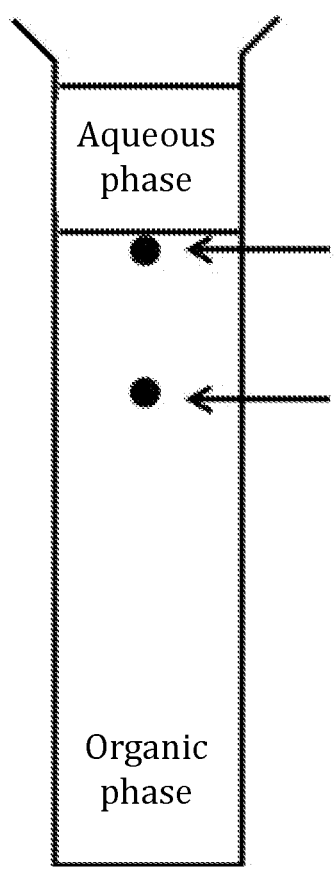

METHOD FOR PRODUCING POLYCARBONATE-POLYORGANOSILOXANE COPOLYMER

RELATED APPLICATIONS

The present application claims priority under 35 U.S.C. § 371 to International Patent Application number PCT/JP2016/075202, filed Aug. 29, 2016, which claims priority to Japanese Patent Application No. 2015-167756, filed Aug. 27, 2015. The contents of these applications are hereby incorporated by reference in their entireties.

TECHNICAL FIELD

The present invention relates to a method of stably producing a polycarbonate-polyorganosiloxane copolymer having a large polyorganosiloxane block content.

BACKGROUND ART

A polycarbonate-polyorganosiloxane copolymer (hereinafter sometimes abbreviated as "PC-POS copolymer") has been attracting attention because of its excellent properties, such as high impact resistance, chemical resistance, and flame retardancy. Accordingly, the polycarbonate-polyorganosiloxane copolymer has been expected to be widely utilized in various fields, such as the field of electrical and electronic equipment and the field of automobiles. In particular, the utilization of the polycarbonate-polyorganosiloxane copolymer in casings for a cellular phone, a mobile personal computer, a digital camera, a video camera, an electric tool, and the like, and in other commodities has been expanding.

In normal cases, a homopolycarbonate using 2,2-bis(4-hydroxyphenyl)propane [common name: bisphenol A] as a dihydric phenol serving as a raw material has been generally used as a typical polycarbonate. In order to improve the physical properties of the homopolycarbonate, such as flame retardancy and impact resistance, it has been known that a polycarbonate-based resin composition is obtained by mixing a polycarbonate-polyorganosiloxane copolymer using a polyorganosiloxane as a copolymerizable monomer in the homopolycarbonate (Patent Document 1).

As the content of a polyorganosiloxane block in the polycarbonate-polyorganosiloxane copolymer becomes larger, the resin composition containing a predetermined amount of the polyorganosiloxane block can be produced at a lower mixing ratio with respect to the homopolycarbonate. Accordingly, the time period for which the polycarbonate-polyorganosiloxane copolymer needed for obtaining the resin composition containing the predetermined amount of the polyorganosiloxane block is produced can be shortened.

CITATION LIST

Patent Document

Patent Document 1: JP 05-140461 A

SUMMARY OF INVENTION

Technical Problem

However, it has been found that when an attempt is made to produce a polycarbonate-polyorganosiloxane copolymer having a large polyorganosiloxane block content, an organic phase undergoes two-layer separation at the time of settled separation after polymerization. When the organic phase undergoes the two-layer separation, the composition of the organic phase to be obtained changes with time, and hence it becomes difficult to stably produce a polycarbonate-polyorganosiloxane copolymer having constant quality.

The present invention has been made in view of the problem, and relates to a method of stably producing a polycarbonate-polyorganosiloxane copolymer having a large polyorganosiloxane block content.

Solution to Problem

The inventors of the present invention have made extensive investigations, and as a result, have found that when specific conditions concerning the solid content weight of a polycarbonate oligomer in 1 L of a mixed solution of an organic solvent and the polycarbonate oligomer, the concentration of a polyorganosiloxane in a polycarbonate-polyorganosiloxane copolymer, and the chain length of the polyorganosiloxane are satisfied at the time of the production of the polycarbonate-polyorganosiloxane copolymer, a polycarbonate-polyorganosiloxane copolymer having a large polyorganosiloxane block content can be stably produced.

That is, the present invention relates to the following items [1] to [14].

[1] A method of producing a polycarbonate-polyorganosiloxane copolymer, comprising a step (Q) of causing a polycarbonate oligomer and at least one of polyorganosiloxanes represented by the following general formulae (i) to (iii) to react with each other in an organic solvent, wherein in the step, a solid content weight x (g/L) of the polycarbonate oligomer in 1 L of a mixed solution of the organic solvent and the polycarbonate oligomer, a concentration y (mass %) of the polyorganosiloxane in the polycarbonate-polyorganosiloxane copolymer to be obtained, and a chain length n of the polyorganosiloxane satisfy conditions described in any one of the following formulae (I-I), (I-II), (I-III), (II-I), (II-II), (II-III), (III-I), and (IV-I):

$36 \leq n < 75, 15 \leq y < 26, 80 \leq x < 190,$ (I-I):

$36 \leq n < 75, 26 \leq y \leq 35, 80 \leq x \leq 170,$ (I-II):

$36 \leq n < 75, 35 < y \leq 50, 80 \leq x \leq 130,$ (I-III):

$75 \leq n \leq 110, 10 \leq y < 20, 80 \leq x \leq 190,$ (II-I):

$75 \leq n \leq 110, 20 \leq y \leq 30, 80 \leq x \leq 145,$ (II-II):

$75 \leq n \leq 110, 30 < y \leq 50, 80 \leq x \leq 130,$ (II-III):

$110 < n \leq 200, 5 \leq y \leq 15, 130 \leq x \leq 185,$ (III-I):

$200 < n \leq 350, 5 \leq y \leq 10, 130 \leq x \leq 185$ (IV-I):

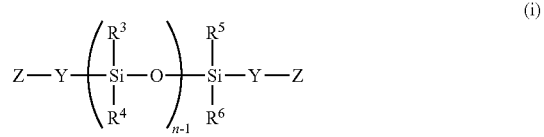

(i)

-continued

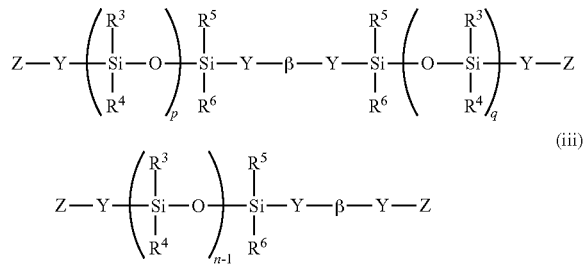

(ii)

(iii)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, Z represents a hydrogen atom or a halogen atom, and a plurality of Z may be identical to or different from each other, β represents a divalent group derived from a diisocyanate compound, or a divalent group derived from a dicarboxylic acid or a halide of a dicarboxylic acid, n represents the chain length of the polyorganosiloxane, and n−1, and p and q each represent a number of repetitions of a polyorganosiloxane unit and each represent an integer of 1 or more, and a sum of p and q is n−2.

[2] The method of producing a polycarbonate-polyorganosiloxane copolymer according to Item [1], wherein in the step (Q), the solid content weight x (g/L) of the polycarbonate oligomer in 1 L of the mixed solution of the organic solvent and the polycarbonate oligomer, the concentration y (mass %) of the polyorganosiloxane in the polycarbonate-polyorganosiloxane copolymer to be obtained, and the chain length n of the polyorganosiloxane satisfy the following mathematical formula (1).

$$-2.0\times10^{-5}x^3+1.1\times10^{-5}nx^2+1.5\times10^{-4}yx^2-6.0\times10^{-7}n^2x-1.6\times10^{-4}y^2x-2.8\times10^{-5}nyx-18.8\leq0 \quad (1)$$

[3] The method of producing a polycarbonate-polyorganosiloxane copolymer according to Item [1] or [2], wherein in the step (Q), the chain length n of the polyorganosiloxane and the concentration y (mass %) of the polyorganosiloxane in the polycarbonate-polyorganosiloxane copolymer to be obtained satisfy the following mathematical formula (2).

$$n\times y \geq 1100 \quad (2)$$

[4] The method of producing a polycarbonate-polyorganosiloxane copolymer according to any one of Items [1] to [3], wherein the polycarbonate oligomer has a weight-average molecular weight of from 1,500 to 2,900.

[5] The method of producing a polycarbonate-polyorganosiloxane copolymer according to any one of Items [1] to [4], wherein the step (Q) comprises adding a polymerization catalyst so that a molar ratio of the polymerization catalyst to a chloroformate is 0.001 or more to 0.02 or less.

[6] The method of producing a polycarbonate-polyorganosiloxane copolymer according to any one of Items [1] to [5], wherein the step (Q) comprises adding aqueous sodium hydroxide so that a molar ratio of sodium hydroxide to a chloroformate is 0.10 or more to 0.75 or less.

[7] The method of producing a polycarbonate-polyorganosiloxane copolymer according to any one of Items [1] to [6], wherein the method comprises further adding a dihydric phenol after the step (Q).

[8] The method of producing a polycarbonate-polyorganosiloxane copolymer according to any one of Items [1] to [7], wherein the method comprises performing a polymerization reaction after the step (Q) while keeping a temperature at from 20° C. to 40° C.

[9] The method of producing a polycarbonate-polyorganosiloxane copolymer according to any one of Items [1] to [8], wherein the polycarbonate-polyorganosiloxane copolymer to be obtained has a viscosity-average molecular weight of from 9,000 to 50,000.

[10] A method of producing a polycarbonate-based resin composition, comprising mixing a polycarbonate-polyorganosiloxane copolymer (A) obtained by the production method of any one of Items [1] to [9] and a polycarbonate-based resin (B) except the polycarbonate-polyorganosiloxane copolymer (A).

[11] The method of producing a polycarbonate-based resin composition according to Item [10], wherein a weight ratio "(A)/(B)" of the polycarbonate-polyorganosiloxane copolymer (A) to the polycarbonate-based resin (B) is from 1/99 to 83/17.

[12] The method of producing a polycarbonate-based resin composition according to Item [10] or [11], wherein the polycarbonate-based resin composition to be obtained has a viscosity-average molecular weight of from 9,000 to 50,000.

[13] The method of producing a polycarbonate-based resin composition according to any one of Items [10] to [12], wherein a polyorganosiloxane chain length (n) and a polyorganosiloxane concentration (y') (mass %) in the resin composition satisfy the following mathematical formula (3).

$$n\times y' \leq 1000 \quad (3)$$

[14] The method of producing a polycarbonate-based resin composition according to any one of Items [10] to [13], wherein the polycarbonate-based resin (B) comprises an aromatic homopolycarbonate.

Advantageous Effects of Invention

According to the present invention, at the time of the production of the polycarbonate-polyorganosiloxane copolymer, in the step of causing a polycarbonate oligomer and at least one kind of raw material polyorganosiloxane to react with each other in an organic solvent, specific parameters concerning the solid content weight of the polycarbonate oligomer in 1 L of a mixed solution of the organic solvent and the polycarbonate oligomer, the concentration of the polyorganosiloxane in the polycarbonate-polyorganosiloxane copolymer to be obtained, and the chain length of the polyorganosiloxane are satisfied, and hence the polycarbonate-polyorganosiloxane copolymer having a large polyorganosiloxane block content can be stably produced.

BRIEF DESCRIPTION OF DRAWINGS

FIG. 1 is a schematic view for illustrating sampling points in the two-layer separation evaluation of Examples.

DESCRIPTION OF EMBODIMENTS

A method of producing a polycarbonate-polyorganosiloxane copolymer of the present invention is a method of producing a polycarbonate-polyorganosiloxane copolymer, comprising a step (Q) of causing a polycarbonate oligomer and at least one of polyorganosiloxanes represented by the following general formulae (i) to (iii) to react with each other in an organic solvent, wherein in the step, a solid content weight x (g/L) of the polycarbonate oligomer in 1 L of a mixed solution of the organic solvent and the polycarbonate oligomer, a concentration y (mass %) of the polyorganosiloxane in the polycarbonate-polyorganosiloxane copolymer to be obtained, and a chain length n of the polyorganosiloxane satisfy conditions described in any one of the following formulae (I-I), (I-II), (I-III), (II-I), (II-II), (II-III), (III-I), and (IV-I):

$36 \leq n < 75, 15 \leq y < 26, 80 \leq x < 190$, (I-I):

$36 \leq n < 75, 26 \leq y \leq 35, 80 \leq x \leq 170$, (I-II):

$36 \leq n < 75, 35 < y \leq 50, 80 \leq x \leq 130$, (I-III):

$75 \leq n \leq 110, 10 \leq y < 20, 80 \leq x \leq 190$, (II-I):

$75 \leq n \leq 110, 20 \leq y \leq 30, 80 \leq x \leq 145$, (II-II):

$75 \leq n \leq 110, 30 < y \leq 50, 80 \leq x \leq 130$, (II-III):

$110 < n \leq 200, 5 \leq y \leq 15, 130 \leq x \leq 185$, (III-I):

$200 < n \leq 350, 5 \leq y \leq 10, 130 \leq x \leq 185$ (IV-I):

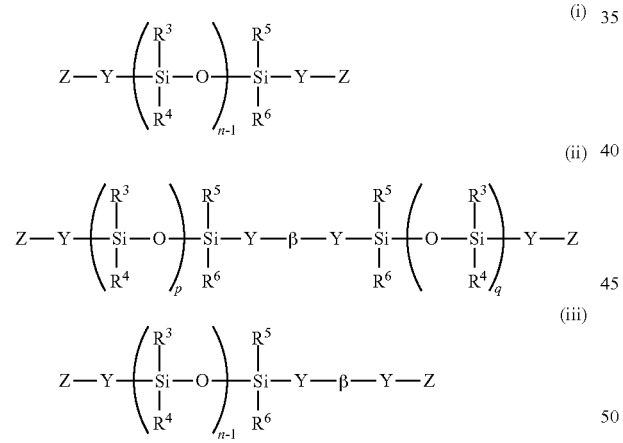

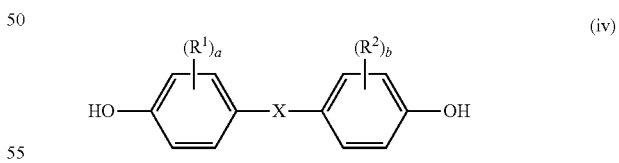

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ or $R^6$ may be identical to or different from each other, Y represents —$R^7$O—, —$R^7$COO—, —$R^7$NH—, —$R^7NR^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched or cyclic alkylene group, or a diarylene group, Z represents a hydrogen atom or a halogen atom, and a plurality of Z may be identical to or different from each other, β represents a divalent group derived from a diisocyanate compound, or a divalent group derived from a dicarboxylic acid or a halide of a dicarboxylic acid, n represents the chain length of the polyorganosiloxane, and n−1, and p and q each represent a number of repetitions of a polyorganosiloxane unit and each represent an integer of 1 or more, and a sum of p and q is n−2.

<Polycarbonate Oligomer>

The polycarbonate oligomer can be produced by a reaction between a dihydric phenol and a carbonate precursor, such as phosgene or triphosgene, in an organic solvent, such as methylene chloride, chlorobenzene, or chloroform. The dihydric phenol is used as an alkaline aqueous solution of the dihydric phenol obtained by dissolving the dihydric phenol in an aqueous solution of an alkaline compound. In the present invention, the polycarbonate oligomer is produced by using an interfacial polymerization method. The weight-average molecular weight of the polycarbonate oligomer to be obtained at this time is preferably from 1,500 to 2,900, more preferably from 1,700 to 2,500.

The weight-average molecular weight (Mw) of the polycarbonate oligomer was measured as a molecular weight in terms of a polycarbonate (weight-average molecular weight: Mw) by GPC [column: TOSOH TSK-GEL GHXL-L, G4000HXL+G2000HXL, temperature: 40° C., flow rate: 1.0 ml/min, detector: RI] through the use of tetrahydrofuran (THF) as a developing solvent. The molecular weight in terms of the polycarbonate was determined by using a calibration curve prepared with a standard polystyrene according to the universal calibration method involving using the constants K and a of the Mark-Houwink-Sakurada equation. Specifically, the molecular weight was determined by a method described in ""Size Exclusion Chromatography", written by Sadao Mori, p. 67 to 69, 1992, Kyoritsu Shuppan Co., Ltd." according to the following equation:

$\text{Log } M(PC) = (1/(1+a2))\log(K1/K2) + ((1+a1)/(1+a2)) \log M(PS)$ wherein K1 and a1 each represent a coefficient of polystyrene under the above-mentioned measurement conditions, and K2 and a2 each represent a coefficient of polycarbonate.

$K1 = 12.2 \times 10^{-5}, K2 = 38.5 \times 10^{-5}, a1 = 0.72, a2 = 0.70$

A dihydric phenol represented by the following general formula (iv) is preferably used as the dihydric phenol:

(iv)

HO—⌬—(R¹)ₐ—X—⌬—(R²)ᵦ—OH wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO₂—, —O—, or —CO—, and a and b each independently represent an integer of from 0 to 4.

Examples of the halogen atom that $R^1$ and $R^2$ each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups (the term "various" means that a linear group and all kinds of branched groups are included, and in this description, the same applies hereinafter.), various pentyl groups, and various hexyl groups. Examples of the alkoxy group that $R^1$ and $R^2$ each independently represent include alkoxy groups having the above-mentioned alkyl groups as alkyl group moieties.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred. Examples of the aryl moiety of the arylalkylene group represented by X include aryl groups each having 6 to 14 ring-forming carbon atoms, such as a phenyl group, a naphthyl group, a biphenyl group, and an anthryl group. Examples of the aryl moiety of the arylalkylidene group represented by X include aryl groups each having 6 to 14 ring-forming carbon atoms, such as a phenyl group, a naphthyl group, a biphenyl group, and an anthryl group.

a and b each independently represent an integer of from 0 to 4, preferably from 0 to 2, more preferably 0 or 1.

Among them, a repeating unit in which a and b each represent 0, and X represents a single bond or an alkylene group having 1 to 8 carbon atoms, or a repeating unit in which a and b each represent 0, and X represents an alkylene group having 3 carbon atoms, in particular an isopropylidene group is suitable.

Examples of the dihydric phenol represented by the general formula (iv) include: bis(hydroxyphenyl)alkane dihydric phenols, such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl; bis(4-hydroxyphenyl)cycloalkanes; bis(4-hydroxyphenyl) oxide; bis(4-hydroxyphenyl) sulfide; bis(4-hydroxyphenyl) sulfone; bis(4-hydroxyphenyl) sulfoxide; and bis(4-hydroxyphenyl) ketone. Those dihydric phenols may be used alone or as a mixture thereof.

Among them, bis(hydroxyphenyl)alkane dihydric phenols are preferred, and bisphenol A is more preferred. When bisphenol A is used as the dihydric phenol, the PC-POS copolymer is such that in the general formula (iv), X represents an isopropylidene group and a=b=0.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiarylfluorenes, and dihydroxydiaryladamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl) propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of dihydric phenols except those described above include 4,4'-[1,3-phenylenebis(1-methylethylidene)] bisphenol, 10,10-bis(4-hydroxyphenyl)-9-anthrone, and 1,5-bis(4-hydroxyphenylthio)-2,3-dioxapentane.

In normal cases, a solution having an alkali concentration of from 1 mass % to 15 mass % is preferably used as the alkaline aqueous solution in which the dihydric phenol is dissolved. The amount of the dihydric phenol in the alkaline aqueous solution is typically selected from the range of from 0.5 mass % to 20 mass %.

Examples of the alkaline aqueous solution may include aqueous solutions of alkaline inorganic compounds including: alkaline metal hydroxides, such as sodium hydroxide and potassium hydroxide; and alkaline earth metal hydroxides, such as magnesium hydroxide and calcium hydroxide. Among them, an aqueous solution of an alkaline metal hydroxide is preferred and aqueous sodium hydroxide is more preferred.

A tertiary amine (e.g., triethylamine) or a quaternary amine (e.g., trimethylbenzylammonium chloride) can be used as a catalyst.

The organic solvent is, for example, a solvent that dissolves a polycarbonate oligomer and a polycarbonate resin to be obtained. Specific examples thereof include halogenated hydrocarbon solvents, such as dichloromethane (methylene chloride), dichloroethane, trichloroethane, tetrachloroethane, pentachloroethane, hexachloroethane, dichloroethylene, chlorobenzene, and dichlorobenzene. Among them, methylene chloride is particularly preferred.

<Reaction Between Polycarbonate Oligomer and Polyorganosiloxane in Organic Solvent (Step Q)>

In this step, the resultant polycarbonate oligomer solution and at least one of the polyorganosiloxanes represented by the general formulae (i) to (iii) are subjected to interfacial polymerization in the organic solvent. In the present invention, in this step, a solid content weight x (g/L) of the polycarbonate oligomer in 1 L of a mixed solution of the organic solvent and the polycarbonate oligomer, a concentration y (mass %) of the polyorganosiloxane in the polycarbonate-polyorganosiloxane copolymer to be obtained, and a chain length n of the polyorganosiloxane need to satisfy conditions described in any one of the following formulae (I-I), (I-II), (I-III), (II-I), (II-II), (II-III), (III-I), and (IV-I):

$$36 \leq n < 75, 15 \leq y < 26, 80 \leq x < 190, \quad \text{(I-I)}$$

$$36 \leq n < 75, 26 \leq y \leq 35, 80 \leq x \leq 170, \quad \text{(I-II)}$$

$$36 \leq n < 75, 35 < y \leq 50, 80 \leq x \leq 130, \quad \text{(I-III)}$$

$$75 \leq n \leq 110, 10 \leq y < 20, 80 \leq x \leq 190, \quad \text{(II-I)}$$

$$75 \leq n \leq 110, 20 \leq y \leq 30, 80 \leq x \leq 145, \quad \text{(II-II)}$$

$$75 \leq n \leq 110, 30 < y \leq 50, 80 \leq x \leq 130, \quad \text{(II-III)}$$

$$110 < n \leq 200, 5 \leq y \leq 15, 130 \leq x \leq 185, \quad \text{(III-I)}$$

$$200 < n \leq 350, 5 \leq y \leq 10, 130 \leq x \leq 185 \quad \text{(IV-I)}$$

The method of producing a polycarbonate-polyorganosiloxane copolymer of the present invention satisfies the conditions described in any one of the conditional formulae (I-I), (I-II), (I-III), (II-I), (II-II), (II-III), (III-I), and (IV-I), and hence even when the content of the polyorganosiloxane is high or the chain length of the polyorganosiloxane is relatively long, two-layer separation at the time of the settled separation of an organic phase to be finally obtained after the copolymerization can be significantly suppressed.

The inventors have found the following problem: in the method of producing a polycarbonate-polyorganosiloxane copolymer, when the chain length of the polyorganosiloxane is lengthened or its content is increased, at the time of the separation of the organic phase and an aqueous phase from each other by the settled separation after a washing step to be described later to be performed after the polymerization reaction, the organic phase itself separates into two layers. Although a cause for the foregoing is unclear, the following reason is conceivable. As the chain length of the polyorganosiloxane becomes longer and as the content of the polyorganosiloxane becomes larger, in the step (Q), it tends to be more difficult for the polyorganosiloxane to dissolve in the organic solvent containing the polycarbonate oligomer. In this case, the copolymerization reaction between the polycarbonate oligomer and the polyorganosiloxane heterogeneously advances, and hence the composition of the polycarbonate-polyorganosiloxane copolymer to be obtained becomes heterogeneous. When the settled separation is performed under a state in which the composition is heterogeneous as described above, the organic phase may undergo the two-layer separation.

When the organic phase in a state of undergoing the two-layer separation as described above is isolated from the aqueous phase, the composition of the polycarbonate-polyorganosiloxane copolymer to be obtained becomes heterogeneous.

According to the production method of the present invention, the solid content weight x (g/L) of the polycarbonate oligomer in 1 L of the mixed solution of the organic solvent and the polycarbonate oligomer, the concentration (y) of the polyorganosiloxane in the polycarbonate-polyorganosiloxane copolymer to be obtained, and the chain length n of the polyorganosiloxane satisfy any one of the conditional formulae (I-I) to (IV-I), and hence the two-layer separation can be suppressed.

In addition, from the viewpoint that the two-layer separation is further suppressed, in each of the conditional formulae (I-I) to (IV-I), the solid content weight x (g/L) of the polycarbonate oligomer in 1 L of the mixed solution of the organic solvent and the polycarbonate oligomer more preferably satisfies the following condition:

under the conditions of $36 \leq n < 75, 15 \leq y < 26$, and $80 \leq x \leq 190, x$(g/L) falls within a range of preferably $100 \leq x \leq 180$, more preferably $110 \leq x \leq 170$, still more preferably $120 \leq x \leq 170$, (I-I):

under the conditions of $36 \leq n < 75, 26 \leq y \leq 35$, and $80 \leq x \leq 170, x$(g/L) falls within a range of preferably $90 \leq x \leq 160$, more preferably $100 \leq x \leq 150$, still more preferably $100 \leq x \leq 140$, (I-II):

under the conditions of $36 \leq n < 75, 35 < y \leq 50$, and $80 \leq x \leq 130, x$(g/L) falls within a range of preferably $90 \leq x \leq 120$, more preferably $90 \leq x \leq 110$, still more preferably $90 \leq x \leq 105$, (I-III):

under the conditions of $75 \leq n \leq 110, 10 \leq y < 20$, and $80 \leq x \leq 190, x$(g/L) falls within a range of preferably $100 \leq x \leq 160$, more preferably $110 \leq x \leq 140$, still more preferably $120 \leq x \leq 130$, (II-I):

under the conditions of $75 \leq n \leq 110, 20 \leq y \leq 30$, and $80 \leq x \leq 145, x$(g/L) falls within a range of preferably $90 \leq x \leq 140, 100 \leq x \leq 130$, or $100 \leq x \leq 120$, (II-II):

under the conditions of $75 \leq n \leq 110, 30 < y \leq 50$, and $80 \leq x \leq 130, x$(g/L) falls within a range of preferably $90 \leq x \leq 120$, more preferably $90 \leq x \leq 110$, still more preferably $90 \leq x \leq 105$, (II-III):

under the conditions of $110 < n \leq 200, 5 \leq y \leq 15$, and $130 \leq x \leq 185, x$(g/L) falls within a range of preferably $140 \leq x \leq 180, 140 \leq x \leq 175$, or $140 \leq x \leq 170$, (III-I):

under the conditions of $200 < n \leq 350, 5 \leq y \leq 10$, and $130 \leq x \leq 185, x$(g/L) falls within a range of preferably $140 \leq x \leq 180$, more preferably $140 \leq x \leq 175$, still more preferably $140 \leq x \leq 170$. (IV-I):

When the solid content weight (x) of the polycarbonate oligomer in 1 L of the mixed solution of the organic solvent and the polycarbonate oligomer falls within the above-mentioned range in each condition, the two-layer separation is suppressed and handleability at the time of the production of the copolymer is excellent.

When the concentration (y) of the polyorganosiloxane falls within the above-mentioned range, the following result is obtained: the low-temperature impact resistance of a polycarbonate-based resin composition to be finally obtained is more excellent.

When the chain length n is 36 or more, the following result is obtained: the low-temperature impact resistance of the polycarbonate-based resin composition to be finally obtained is more excellent. Meanwhile, when the chain length n is 350 or less, the handleability at the time of the production is excellent. In addition, a lower limit value for the chain length of the polyorganosiloxane is more preferably 55 or more. The chain length is calculated by nuclear magnetic resonance (NMR) measurement.

In the step (Q), a polymerization catalyst is preferably used, and a tertiary amine (e.g., triethylamine) or a quaternary ammonium salt (e.g., trimethylbenzylammonium chloride) is preferably used.

From the viewpoint that an environmental load and the amount of the polyorganosiloxane remaining as an unreacted product are reduced, the concentration of the polymerization catalyst is desirably adjusted so that the molar ratio of the polymerization catalyst to a chloroformate is preferably 0.001 or more to 0.02 or less, more preferably 0.002 or more to 0.008 or less, still more preferably 0.003 or more to 0.006 or less. The chloroformate represents a chloroformate end group in the polycarbonate oligomer.

Preferred examples of the organic solvent are as described above, and methylene chloride is particularly preferred.

In the step (Q), aqueous sodium hydroxide can be further added for accelerating the reaction.

From the viewpoint that the decomposition reaction of the polycarbonate oligomer is suppressed, the molar ratio of sodium hydroxide to a chloroformate in the step (Q) is desirably adjusted to preferably 0.10 or more to 0.75 or less, more preferably 0.15 or more to 0.35 or less, still more preferably 0.20 or more to 0.30 or less, most preferably 0.25 or more to 0.30 or less. In addition, the concentration of the aqueous sodium hydroxide to be added in this step is desirably adjusted to preferably from 2 mass % to 15 mass %, more preferably from 2 mass % to 10 mass %, still more preferably from 4 mass % to 8 mass %. The chloroformate represents the chloroformate end group in the polycarbonate oligomer.

In the step (Q), it is more preferred that the solid content weight (x) of the polycarbonate oligomer in 1 L of the mixed solution of the organic solvent and the polycarbonate oligomer, the concentration (y) of the polyorganosiloxane in the polycarbonate-polyorganosiloxane copolymer to be obtained, and the chain length n of the polyorganosiloxane satisfy the following mathematical formula (1) and/or the following mathematical formula (2).

$$-2.0\times10^{-5}x^3+1.1\times10^{-5}nx^2+1.5\times10^{-4}yx^2-6.0\times10^{-7}n^2x-1.6\times10^{-4}y^2x-2.8\times10^{-5}nyx-18.8\leq 0 \quad (1)$$

$$n\times y \geq 1100 \quad (2)$$

With regard to the polyorganosiloxane serving as a raw material to be used in this step, when the product of the concentration (y) (mass %) of the polyorganosiloxane in the polycarbonate-polyorganosiloxane copolymer and the chain length n of the polyorganosiloxane satisfies the formula (2), a polycarbonate-polyorganosiloxane copolymer (A) having a high concentration or a long chain length can be produced.

At least one of the polyorganosiloxanes represented by the following formulae (i) to (iii) is used as the polyorganosiloxane:

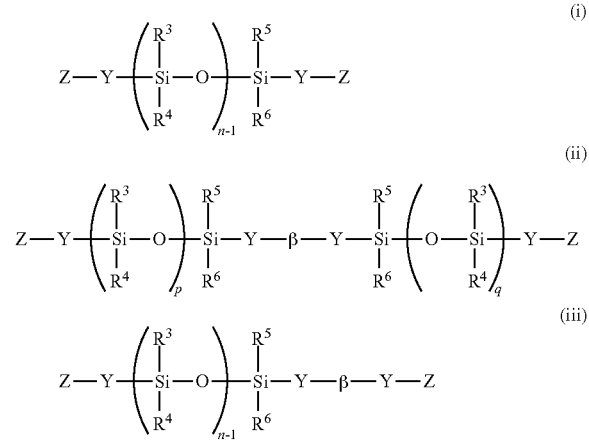

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched or cyclic alkylene group, or a diarylene group, Z represents a hydrogen atom or a halogen atom, and a plurality of Z may be identical to or different from each other, β represents a divalent group derived from a diisocyanate compound, or a divalent group derived from a dicarboxylic acid or a halide of a dicarboxylic acid, n represents the chain length of the polyorganosiloxane, and n–1, and p and q each represent a number of repetitions of a polyorganosiloxane unit and each represent an integer of 1 or more, and a sum of p and q is n–2.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. Examples of the alkoxy group that $R^3$ to $R^6$ each independently represent include alkoxy groups having the above-mentioned alkyl groups as alkyl group moieties. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

$R^3$ to $R^6$ in the general formula (i), the general formula (ii), and/or the general formula (iii) each preferably represent a methyl group.

The linear or branched alkylene group represented by $R^7$ in —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, represented by Y is, for example, an alkylene group having 1 to 8 carbon atoms, preferably 1 to 5 carbon atoms, and the cyclic alkylene group represented by $R^7$ is, for example, a cycloalkylene group having 5 to 15 carbon atoms, preferably 5 to 10 carbon atoms.

The aryl-substituted alkylene group represented by $R^7$ may have a substituent, such as an alkoxy group or an alkyl group, on its aromatic ring, and a specific structure thereof may be, for example, a structure represented by the following general formula (v) or (vi). When the block has the aryl-substituted alkylene group, the alkylene group is bonded to Si.

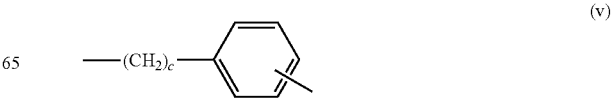

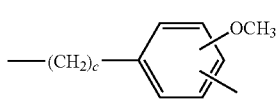

wherein c represents a positive integer and typically represents an integer of from 1 to 6.

The diarylene group represented by any one of $R^7$, $R^9$, and $R^{10}$ refers to a group in which two arylene groups are linked to each other directly or through a divalent organic group, and is specifically a group having a structure represented by $—Ar^1—W—Ar^2—$. Here, $Ar^1$ and $Ar^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by any one of $R^7$, $Ar^1$, and $Ar^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^8$ is a linear or branched group having 1 to 8, preferably 1 to 5 carbon atoms. The alkenyl group represented by $R^8$ is, for example, a linear or branched group having 2 to 8, preferably 2 to 5 carbon atoms. The aryl group represented by $R^8$ is, for example, a phenyl group or a naphthyl group. The aralkyl group represented by $R^8$ is, for example, a phenylmethyl group or a phenylethyl group.

The linear, branched or cyclic alkylene group represented by $R^{10}$ is the same as that represented by $R^7$.

Y preferably represents $—R^7O—$. $R^7$ preferably represents an aryl-substituted alkylene group, in particular a residue of a phenol-based compound having an alkyl group, and more preferably represents an organic residue derived from allylphenol or an organic residue derived from eugenol.

With regard to p and q in the formula (ii), it is preferred that p=q.

β represents a divalent group derived from a diisocyanate compound, or a divalent group derived from a dicarboxylic acid or a halide of a dicarboxylic acid, and examples thereof include divalent groups represented by the following general formulae (vii) to (xi).

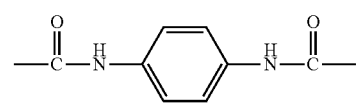

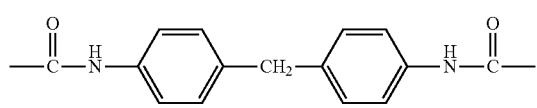

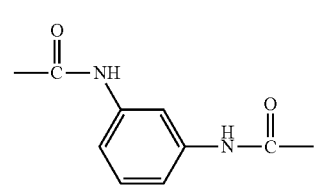

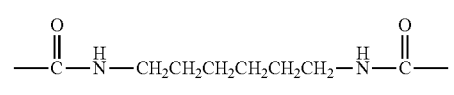

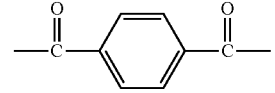

Examples of the polyorganosiloxane represented by the general formula (i) include compounds represented by the following general formulae (i-i) to (i-xi):

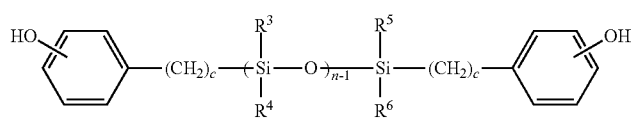

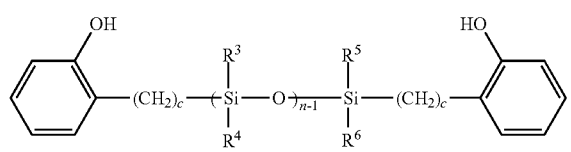

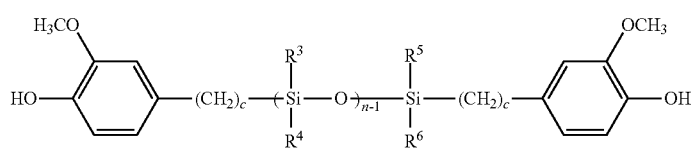

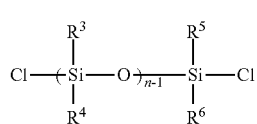

-continued

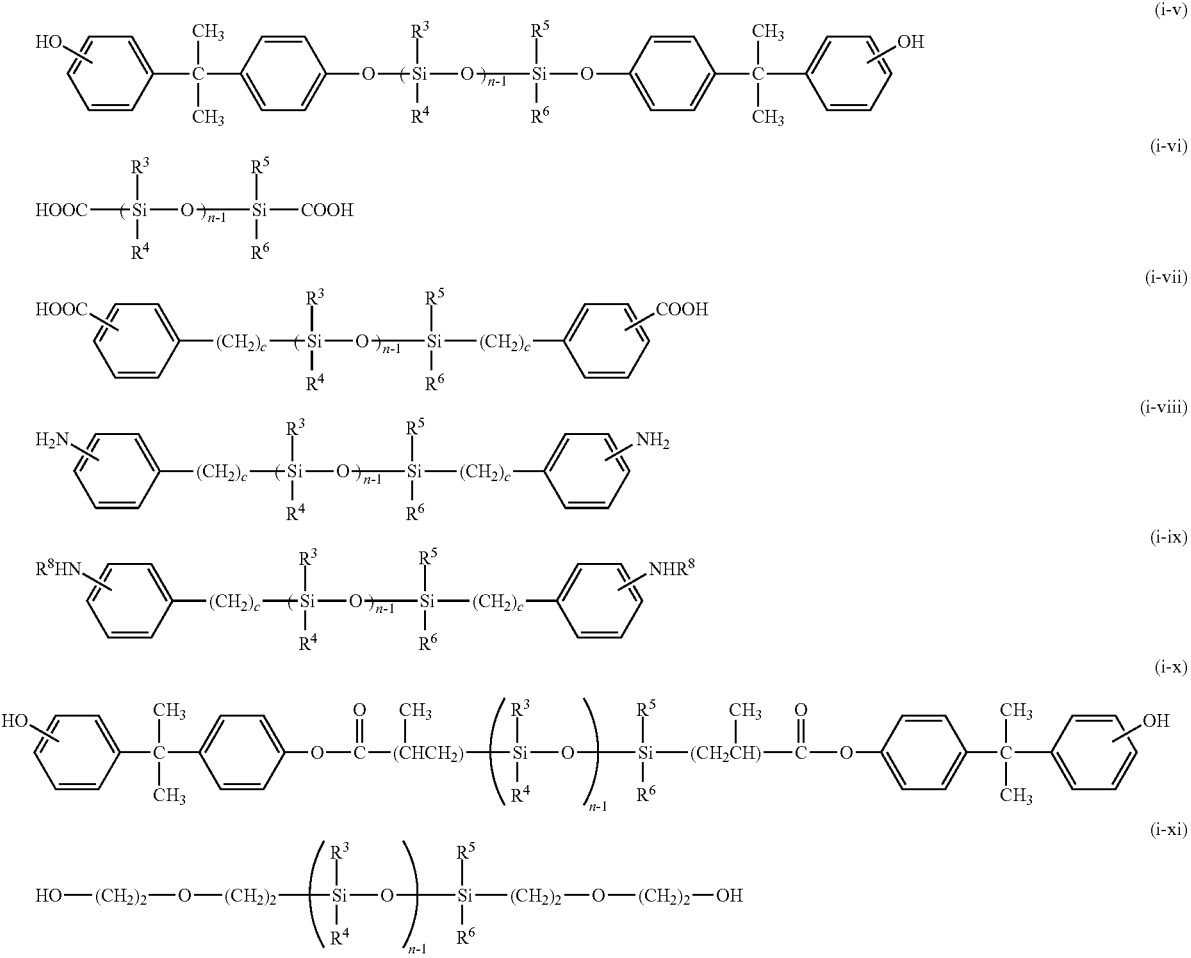

In the general formulae (i-i) to (i-xi), $R^3$ to $R^6$, n, and $R^8$ are as defined above, and preferred examples thereof are also the same as those described above, and c represents a positive integer and typically represents an integer of from 1 to 6.

Among them, a phenol-modified polyorganosiloxane represented by the general formula (i-i) is preferred from the viewpoint of its ease of polymerization. In addition, an α,ω-bis[3-(o-hydroxyphenyl)propyl]polydimethylsiloxane, which is one of compound represented by the general formula (i-ii), or an α, ω-bis [3-(4-hydroxy-3-methoxyphenyl)propyl]polydimethylsiloxane, which is one of compound represented by the general formula (i-iii), is preferred from the viewpoint of its ease of availability.

In addition, a compound having a structure represented by the following general formula (xii) may be used as a polyorganosiloxane raw material:

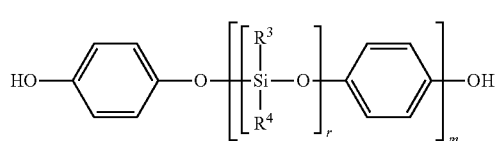
(xii)

wherein $R^3$ and $R^4$ are identical to those described above. The average chain length of the polyorganosiloxane block represented by the general formula (xii) is (rxm), and the range of the (rxm) is the same as that of the n.

When the compound represented by the general formula (xii) is used as a polyorganosiloxane raw material, the polyorganosiloxane block preferably has a unit represented by the following general formula (II-IV):

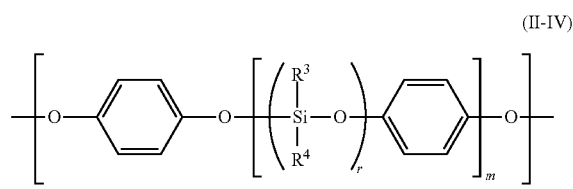
(II-IV)

wherein $R^3$, $R^4$, r, and m are as described above.

A method of producing the polyorganosiloxane is not particularly limited. According to, for example, a method described in JP 11-217390 A, a crude polyorganosiloxane can be obtained by: causing cyclotrisiloxane and disiloxane to react with each other in the presence of an acid catalyst to synthesize α,ω-dihydrogen organopentasiloxane; and then subjecting the α,ω-dihydrogen organopentasiloxane to an addition reaction with, for example, a phenolic compound (e.g., 2-allylphenol, 4-allylphenol, eugenol, or 2-propenylphenol) in the presence of a catalyst for a hydrosilylation reaction. In addition, according to a method described in JP 2662310 B2, the crude polyorganosiloxane can be obtained by: causing octamethylcyclotetrasiloxane and tetramethyldisiloxane to react with each other in the presence of sulfuric acid (acid catalyst); and subjecting the resultant α, ω-dihydrogen organopolysiloxane to an addition reaction with the phenolic compound or the like in the presence of the catalyst for a hydrosilylation reaction in the same manner as that described above. The α, ω-dihydrogen organopolysiloxane may be used after its chain length n has been appropriately adjusted in accordance with its polymerization conditions, or a commercial α,ω-dihydrogen organopolysiloxane may be used.

Examples of the catalyst for a hydrosilylation reaction include transition metal-based catalysts. Among them, a platinum-based catalyst is preferably used in terms of a reaction rate and selectivity. Specific examples of the platinum-based catalyst include chloroplatinic acid, an alcohol solution of chloroplatinic acid, an olefin complex of platinum, a complex of platinum and a vinyl group-containing siloxane, platinum-supported silica, and platinum-supported activated carbon.

The crude polyorganosiloxane is preferably brought into contact with an adsorbent to cause the adsorbent to adsorb and remove a transition metal derived from a transition metal-based catalyst in the crude polyorganosiloxane, the catalyst having been used as the catalyst for a hydrosilylation reaction.

An adsorbent having an average pore diameter of, for example, 1,000 Å or less can be used as the adsorbent. When the average pore diameter is 1,000 Å or less, the transition metal in the crude polyorganosiloxane can be efficiently removed. From such viewpoint, the average pore diameter of the adsorbent is preferably 500 Å or less, more preferably 200 Å or less, still more preferably 150 Å or less, still further more preferably 100 Å or less. In addition, from the same viewpoint, the adsorbent is preferably a porous adsorbent.

Although the adsorbent is not particularly limited as long as the adsorbent has the above-mentioned average pore diameter, for example, activated clay, acid clay, activated carbon, synthetic zeolite, natural zeolite, activated alumina, silica, a silica-magnesia-based adsorbent, diatomaceous earth, or cellulose can be used, and at least one selected from the group consisting of activated clay, acid clay, activated carbon, synthetic zeolite, natural zeolite, activated alumina, silica, and a silica-magnesia-based adsorbent is preferred.

After the adsorbent has been caused to adsorb the transition metal in the crude polyorganosiloxane, the adsorbent can be separated from the polyorganosiloxane by arbitrary separating means. Examples of the means for separating the adsorbent from the polyorganosiloxane include a filter and centrifugal separation. When the filter is used, a filter, such as a membrane filter, a sintered metal filter, or a glass fiber filter, can be used. Among them, a membrane filter is particularly preferably used.

The average particle diameter of the adsorbent is typically from 1 μm to 4 mm, preferably from 1 μm to 100 μm from the viewpoint that the adsorbent is separated from the polyorganosiloxane after the adsorption of the transition metal.

When the adsorbent is used, its usage amount is not particularly limited. The porous adsorbent can be used in an amount in the range of preferably from 1 part by mass to 30 parts by mass, more preferably from 2 parts by mass to 20 parts by mass with respect to 100 parts by mass of the crude polyorganosiloxane.

When the crude polyorganosiloxane to be treated has so high a molecular weight that the polyorganosiloxane is not in a liquid state, the polyorganosiloxane may be heated to such a temperature as to be in a liquid state at the time of the performance of the adsorption with the adsorbent and the separation of the adsorbent. Alternatively, the adsorption and the separation may be performed after the polyorganosiloxane has been dissolved in a solvent, such as methylene chloride or hexane.

The step (Q) can be performed by using a line mixer, a static mixer, an orifice mixer, a stirring vessel, a tower-type stirring tank with a vertical multistage impeller, a stationary tank, a pipe, or the like as a reactor. A reactor having a stirring function is preferably used as the reactor of the step (Q), and the line mixer, the static mixer, the orifice mixer, the stirring vessel, or the like is preferably used.

<Main Polymerization Step>

A main polymerization step is a step of further adding a dihydric phenol compound to advance a polymerization reaction, and in this step, a reaction liquid obtained in the step (Q) and the dihydric phenol are polymerized. Specifically, the reaction liquid obtained in the step (Q) and the dihydric phenol are mixed, and a polycondensation reaction is typically completed at a temperature in the range of from 20° C. to 40° C. A plurality of reactors may be used, and a line mixer, a static mixer, an orifice mixer, a stirring vessel, a tower-type stirring tank with a vertical multistage impeller, a stationary tank, a pipe, or the like can be arbitrarily used as any such reactor. In addition, a preferred combination thereof is similarly preferred.

Any one of those described above can be used as the dihydric phenol, and preferred examples thereof are also the same as those described above. Any one of those described above can be used as an alkaline aqueous solution in which the dihydric phenol is dissolved, and preferred examples thereof are also the same as those described above. In addition, a preferred combination thereof is similarly preferred.

In order to adjust the molecular weight of the PC-POS copolymer to be obtained, a terminal stopper may be used. Examples of the terminal stopper include monohydric phenols, such as phenol, p-cresol, p-tert-butylphenol, p-tert-octylphenol, p-cumylphenol, p-nonylphenol, m-pentadecylphenol, and p-tert-amylphenol. Those monohydric phenols may be used alone or in combination thereof.

In each of the step (Q) and the main polymerization step, the reaction is preferably performed at a temperature of from 20° C. to 40° C. in view of, for example, the acceleration of the reaction and the boiling point of the solvent to be used.

The PC-POS copolymer obtained by the present invention has the following structural formulae.

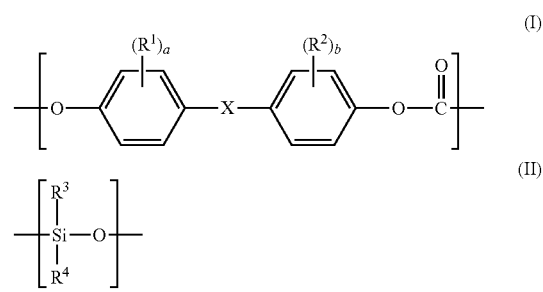

In the formulae (I) and (II), $R^1$, $R^2$, a, b, X, $R^3$, and $R^4$ are as described above, and preferred examples thereof are also the same as those described above. In addition, a preferred combination thereof is similarly preferred.

More specifically, a polyorganosiloxane block containing a repeating unit represented by the general formula (II) preferably has a unit represented by any one of the following general formulae (II-I) to (II-III):

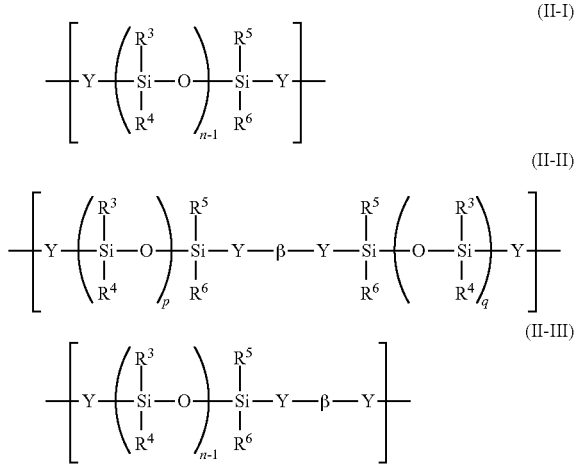

wherein $R^3$ to $R^6$, Y, β, n, and p and q are as described above, and preferred examples thereof are also the same as those described above, and a preferred combination thereof is also the same as that described above.

<Washing/Separating Step>

This washing/separating step is a step of washing an organic phase containing the PC-POS copolymer obtained by the main polymerization step with water through alkali washing, acid washing, and pure water washing to remove an unreacted product, a catalyst residue, and the like.

The PC-POS copolymer can be obtained by concentrating the organic phase obtained after the washing/separating step [concentrating step] and drying the resultant [drying step].

The viscosity-average molecular weight (Mv) of the PC-POS copolymer obtained by the production method of the present invention can be appropriately adjusted with a molecular weight modifier (terminal stopper) or the like so as to be a target molecular weight in accordance with applications and products in which the copolymer is used. The viscosity-average molecular weight of the PC-POS copolymer obtained by the production method of the present invention is preferably from 9,000 to 50,000, more preferably from 12,000 to 30,000, still more preferably from 14,000 to 23,000, particularly preferably from 16,000 to 22,000, most preferably from 16,000 to 20,000. When the viscosity-average molecular weight is 9,000 or more, a sufficient strength of a molded article of the copolymer can be obtained. When the viscosity-average molecular weight is 50,000 or less, injection molding or extrusion molding can be performed at the temperature at which the heat deterioration of the copolymer does not occur.

The viscosity-average molecular weight (Mv) is a value calculated from Schnell's equation ($[\eta]=1.23\times10^{-5}\times Mv^{0.83}$) by measuring the limiting viscosity [η] of a methylene chloride solution at 20° C.

<Method of Producing Polycarbonate-Based Resin Composition>

The present invention also relates to a method of producing a polycarbonate-based resin composition containing the PC-POS copolymer (A) obtained by the above-mentioned method and a polycarbonate-based resin (B) except the copolymer (A).

The polycarbonate-based resin (B) except the polycarbonate-polyorganosiloxane copolymer (A) is preferably an aromatic homopolycarbonate-based resin, is free of a siloxane repeating unit represented by the general formula (II), and contains, in a main chain thereof, a repeating unit represented by the following general formula (III). The polycarbonate-based resin (B) is not particularly limited, and various known polycarbonate-based resins can be used.

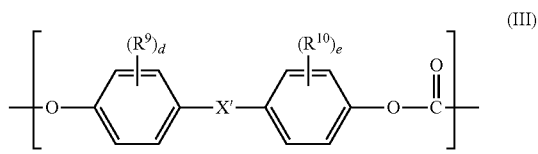

wherein $R^9$ and $R^{10}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and d and e each independently represent an integer of from 0 to 4.

Specific examples of $R^9$ and $R^{10}$ include the same examples as those of $R^1$ and $R^2$, and preferred examples thereof are also the same as those of $R^1$ and $R^2$. $R^9$ and $R^{10}$ each more preferably represent an alkyl group having 1 to 6 carbon atoms or an alkoxy group having 1 to 6 carbon atoms. Specific examples of X' include the same examples as those of X, and preferred examples thereof are also the same as those of X. d and e each independently represent preferably from 0 to 2, more preferably 0 or 1.

Specifically, a resin obtained by a conventional production method for a polycarbonate can be used as the polycarbonate-based resin (B). Examples of the conventional method include: an interfacial polymerization method involving causing the dihydric phenol-based compound and phosgene to react with each other in the presence of an organic solvent inert to the reaction and an aqueous alkaline solution, adding a polymerization catalyst, such as a tertiary amine or a quaternary ammonium salt, to the resultant, and polymerizing the mixture; and a pyridine method involving dissolving the dihydric phenol-based compound in pyridine or a mixed solution of pyridine and an inert solvent, and introducing phosgene to the solution to directly produce the resin.

A molecular weight modifier (terminal stopper), a branching agent, or the like is used as required in the reaction.

The dihydric phenol-based compound is, for example, a compound represented by the following general formula (III'):

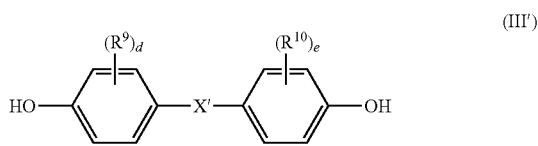

wherein $R^9$, $R^{10}$, X', d, and e are as defined as above, and preferred examples thereof are also the same as those described above.

Specific examples of the dihydric phenol-based compound may include those described in the method of producing the polycarbonate-polyorganosiloxane copolymer (A), and preferred examples thereof are also the same as those described above. Among them, bis (hydroxyphenyl) alkane dihydric phenols are preferred, and bisphenol A is more preferred.

The polycarbonate-based resins (B) may be used alone or in combination thereof.

In the method of producing a polycarbonate-based resin composition of the present invention, the polycarbonate-polyorganosiloxane copolymer (A) and the polycarbonate-based resin (B) are preferably mixed so that the chain length n of the polyorganosiloxane of the polycarbonate-polyorganosiloxane copolymer (A) and the concentration (y') (mass %) of the polyorganosiloxane in the polycarbonate-based resin composition satisfy the following formula (3).

$$n \times y' \leq 1000 \quad (3)$$

In the method of producing a polycarbonate-based resin composition of the present invention, the polycarbonate-polyorganosiloxane copolymer (A) and the polycarbonate-based resin (B) are mixed at a weight ratio "(A)/(B)" of preferably from 1/99 to 83/17, more preferably from 2/98 to 25/75.

Here, the phrase "the PC-POS copolymer (A) and the polycarbonate-based resin (B) except the copolymer (A) are mixed" may include, for example, a mode in which the PC-POS copolymer (A) and the polycarbonate-based resin (B) are blended and kneaded. For example, the blending and the kneading may be performed by a method involving premixing with a typically used apparatus, such as a ribbon blender or a drum tumbler, and using, for example, a Henschel mixer, a Banbury mixer, a single-screw extruder, a twin-screw extruder, a multi-screw extruder, or a Ko-kneader. In normal cases, a heating temperature at the time of the kneading is appropriately selected from the range of from 240° C. to 320° C. An extruder, in particular a vented extruder is preferably used in the melt-kneading.

In the production method of the present invention, the viscosity-average molecular weight (Mv) of the polycarbonate-based resin composition can be appropriately adjusted with a molecular weight modifier (terminal stopper) or the like so as to be a target molecular weight in accordance with applications and products in which the composition is used. The viscosity-average molecular weight of the polycarbonate-based resin composition obtained by the production method of the present invention is preferably from 9,000 to 50,000, more preferably from 12,000 to 30,000, still more preferably from 14,000 to 23,000, particularly preferably from 16,000 to 20,000. When the viscosity-average molecular weight is 9,000 or more, a sufficient strength of a molded article of the composition can be obtained. When the viscosity-average molecular weight is 50,000 or less, injection molding or extrusion molding can be performed at the temperature at which the heat deterioration of the composition does not occur.

The viscosity-average molecular weight (Mv) is a value calculated from Schnell's equation ($[\eta]=1.23\times10^{-5}\times Mv^{0.83}$) by measuring the limiting viscosity $[\eta]$ of a methylene chloride solution at 20° C.

<Other Components>

Any other additive can be incorporated in the method of producing a polycarbonate-based resin composition of the present invention to the extent that the effects of the present invention are not impaired. Examples of the other additive may include a flame retardant, a flame retardant aid, a release agent, a reinforcing material, a filler, an elastomer for an impact resistance improvement, a dye, and a pigment. Any such component only needs to be appropriately mixed in the polycarbonate-polyorganosiloxane copolymer (A) and the polycarbonate-based resin (B).

[Molded Article]

Various molded articles can each be produced by an injection molding method, an injection compression molding method, an extrusion molding method, a blow molding method, a press molding method, a vacuum molding method, an expansion molding method, or the like using as a raw material the melt-kneaded polycarbonate-based resin composition of the present invention or a pellet obtained through the melt-kneading. In particular, the pellet obtained through the melt-kneading can be suitably used in the production of injection-molded articles by injection molding and injection compression molding.

The molded article comprising the polycarbonate-based resin composition of the present invention can be suitably used as, for example, a casing for a part for electrical and electronic equipment, such as a television, a radio-cassette player, a video camera, a videotape recorder, an audio player, a DVD player, an air conditioner, a cellular phone, a display, a computer, a register, an electronic calculator, a copying machine, a printer, or a facsimile.

EXAMPLES

The present invention is more specifically described by way of Examples. However, the present invention is by no means limited by these Examples. In each of Examples, characteristic values and evaluation results were determined in the following manner.

(1) Chain Length and Content of Polydimethylsiloxane

The chain length and content of a polydimethylsiloxane were calculated by NMR measurement from the integrated value ratio of a methyl group of the polydimethylsiloxane.

<Quantification Method for Chain Length of Polydimethylsiloxane>

$^1$H-NMR Measurement Conditions

NMR apparatus: ECA500 manufactured by JEOL Resonance Co., Ltd.
Probe: 50TH5AT/FG2
Observed range: −5 ppm to 15 ppm
Observation center: 5 ppm
Pulse repetition time: 9 sec
Pulse width: 45°
NMR sample tube: 5φ
Sample amount: 30 mg to 40 mg
Solvent: deuterochloroform
Measurement temperature: room temperature
Number of Scans: 256 times
In the Case of Allylphenol-terminated Polydimethylsiloxane
A: an integrated value of a methyl group in a dimethylsiloxane moiety observed around δ−0.02 to δ 0.5
B: an integrated value of a methylene group in allylphenol observed around δ 2.50 to δ 2.75
Chain length of polydimethylsiloxane=(A/6)/(B/4)
In the Case of Eugenol-terminated Polydimethylsiloxane
A: an integrated value of a methyl group in a dimethylsiloxane moiety observed around δ−0.02 to δ−0.5
B: an integrated value of a methylene group in eugenol observed around δ 2.40 to δ 2.70
Chain length of polydimethylsiloxane=(A/6)/(B/4)

<Quantification Method for Content of Polydimethylsiloxane in PC-POS Copolymer> e.g.) Quantification method for the copolymerization amount of a polydimethylsiloxane in a p-t-butylphenol (PTBP)-terminated polycarbonate obtained by copolymerizing an allylphenol-terminated polydimethylsiloxane NMR apparatus: ECA-500 manufactured by JEOL Resonance Co., Ltd.
Probe: TH5 corresponding to 5φNMR sample tube
Observed range: −5 ppm to 15 ppm
Observation center: 5 ppm
Pulse repetition time: 9 sec
Pulse width: 45°
Number of Scans: 256 times
NMR sample tube: 5φ
Sample amount: 30 mg to 40 mg
Solvent: deuterochloroform
Measurement temperature: room temperature
A: an integrated value of a methyl group in a BPA moiety observed around δ 1.5 to δ 1.9
B: an integrated value of a methyl group in a dimethylsiloxane moiety observed around δ−0.02 to δ 0.3
C: an integrated value of a butyl group in a p-t-butylphenyl moiety observed around δ 1.2 to δ 1.4
a=A/6
b=B/6
c=C/9
T=a+b+c
f=a/T×100
g=b/T×100
h=c/T×100
TW=f×254+g×74.1+h×149
PDMS (wt %)=g×74.1/TW×100

(2) Viscosity-Average Molecular Weights of Polycarbonate-Polyorganosiloxane Copolymer and Polycarbonate-based Resin Composition A viscosity-average molecular weight (Mv) was calculated from the following equation (Schnell's equation) by using a limiting viscosity [η] determined through the measurement of the viscosity of a methylene chloride solution at 20° C. with an Ubbelohde-type viscometer.

$$[\eta]=1.23\times10^{-5}\times Mv^{0.83}$$

<Production of Polycarbonate Oligomer>

Sodium dithionite was added in an amount of 2,000 ppm with respect to bisphenol A (BPA) to be dissolved later to 5.6 mass % aqueous sodium hydroxide, and then BPA was dissolved in the mixture so that the concentration of BPA was 13.5 mass %. Thus, a solution of BPA in aqueous sodium hydroxide was prepared. The solution of BPA in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of the reaction liquid was kept at 40° C. or less by passing cooling water through the jacket. The reaction liquid that had exited the tubular reactor was continuously introduced into a baffled vessel type reactor provided with a sweptback blade and having an internal volume of 40 L. The solution of BPA in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to perform a reaction. An aqueous phase was separated and removed by continuously taking out the reaction liquid overflowing the vessel type reactor and leaving the reaction liquid at rest. Then, a methylene chloride phase was collected.

The polycarbonate oligomer thus obtained had a concentration of 330 g/L and a chloroformate group concentration of 0.71 mol/L. In addition, the polycarbonate oligomer had a weight-average molecular weight of 2,040.

<Measurement of Weight-average Molecular Weight>

A weight-average molecular weight (Mw) was measured as a molecular weight in terms of a polycarbonate (weight-average molecular weight: Mw) by GPC [column: TOSOH TSK-GEL GHXL-L, G4000HXL+G2000HXL, temperature: 40° C., flow rate: 1.0 ml/min, detector: RI] through the use of tetrahydrofuran (THF) as a developing solvent. The molecular weight in terms of the polycarbonate was determined by the universal calibration method involving using the constants K and a of the Mark-Houwink-Sakurada equation in order for a calibration curve prepared with a standard polystyrene to be converted into the molecular weight of the polycarbonate. Specifically, the molecular weight was determined by a method described in ""Size Exclusion Chromatography", written by Sadao Mori, p. 67 to 69, 1992, Kyoritsu Shuppan Co., Ltd." according to the following equation:

$$\text{Log } M(PC)=(1/(1+a2))\log(K1/K2)+((1+a1)/(1+a2))\log M(PS)$$

wherein, K1 and a1 each represent a coefficient of polystyrene under the above-mentioned measurement conditions, and K2 and a2 each represent a coefficient of polycarbonate.

$$K1=12.2\times10^{-5}, K2=38.5\times10^{-5}, a1=0.72, a2=0.70$$

<Production of PC-POS Copolymer for Two-layer Separation Evaluation (Examples 1 to 8 and 9 to 14, and Comparative Examples 1 to 4)>

Values for the following (1) to (13) represent the usage amounts of the respective components in Examples and Comparative Examples, and are as shown in Tables 1.

A solution obtained by dissolving (4) g of an allylphenol terminal-modified polydimethylsiloxane (a polydimethylsiloxane is hereinafter sometimes referred to as "PDMS") having an average chain length n of (3) in (1) mL of the polycarbonate oligomer solution (PCO) produced as described above and (2) mL of methylene chloride (MC), and (5) μL of triethylamine (TEA) were loaded into a 1-liter vessel-type reactor including a baffle board and a paddle-type stirring blade. (6) g of 6.4 mass % aqueous sodium hydroxide was added to the mixture under stirring, and a reaction between the polycarbonate oligomer and the allylphenol terminal-modified PDMS was performed for 10 minutes (step (Q)).

A solution of p-t-butylphenol (PTBP) in methylene chloride (obtained by dissolving (7) g of PTBP in (8) mL of methylene chloride (MC)) and a solution of BPA in aqueous sodium hydroxide (obtained by dissolving (12) g of BPA in an aqueous solution obtained by dissolving (9) g of NaOH and (10) g of sodium dithionite ($Na_2S_2O_4$) in (11) mL of water) were added to the polymerization liquid, and a polymerization reaction was performed for 50 minutes (main polymerization step).

(13) mL of methylene chloride (MC) was added to dilute the resultant, and the diluted liquid was stirred for 10 minutes. After that, the liquid was transferred to a 1-liter separating funnel, and was left at rest to be separated into an organic phase containing a PC-POS copolymer, and an aqueous phase containing excess amounts of BPA and NaOH. The organic phase was isolated so that the loss of the organic phase did not occur.

The solution of the PC-POS copolymer in methylene chloride thus obtained was sequentially washed with 0.03 mol/L aqueous NaOH and 0.2 mol/L hydrochloric acid in amounts of 15 vol % each with respect to the solution. In each step, an organic phase was isolated by performing washing with a separating funnel so that the loss of the organic phase did not occur. The step (Q), the main polymerization step, and the washing step were each performed under a state in which a temperature was kept in the range of from 20° C. to 40° C.

<Method for Two-Layer Separation Evaluation>

The total amount of the isolated organic phase was loaded into a 1-liter separating funnel, and pure water was added in an amount of 10 vol % with respect to the solution, followed by shaking for 10 minutes at 300 times/min. Immediately after the completion of the shaking, about 600 mL of a mixed solution of water and the organic phase containing the PC-POS copolymer was loaded into a cylindrical glass container having a diameter of 50 mmφ and a length of 35 cm, and settled separation was initiated. After 2.5 hours, as illustrated in FIG. 1, 2 mL of the organic phase at a position distant from the bottom portion of the cylindrical glass container by 20 cm and 1 mL of the top portion of the organic phase in the cylindrical glass container were sampled, and were loaded into separate sample bottles each having a volume of 10 mL. 1 mL of methylene chloride was added to dilute the sample of the top portion of the organic phase. The sample bottles each containing the organic phase sampled after 2.5 hours were sufficiently shaken with a hand so that their solutions were homogenized. After that, predetermined amounts of the organic phase (0.25 mL in the case of the organic phase distant from the bottom portion by 20 cm and 0.50 mL in the case of the organic phase in the top portion) were weighed, and were each loaded into a 10-milliliter sample bottle whose tare had been weighed, followed by drying at 100° C. for 1.5 hours with an explosion-proof dryer. After that, the sample bottle was left standing to cool for 30 minutes, and the total weight of the content and the sample bottle was weighed. The weight of the tare was subtracted from the total weight, and it was confirmed that the weight of solid matter fell within the range of from 30 mg to 40 mg. The total amount of the resultant solid matter was dissolved in 0.5 mL of a deuterochloroform solvent. The solution was loaded into an NMR measurement tube having a diameter of 5 mmφ so as to have a height of 4 cm, and its PDMS content was measured by $^1$H-NMR.

In the two-layer separation evaluation, after about 600 mL of the mixed solution containing water and the PC-POS copolymer had been loaded into the cylindrical glass container, the mixed solution remaining in the 1-liter separating funnel was left at rest to be subjected to oil-water separation, and the total amount of the isolated organic phase was loaded into a 1-liter flask.

<Measurement of PC-POS Concentration (PCM Concentration) in Solution of PC-POS in Methylene Chloride>

The organic phase was weighed from the organic phase isolated in the 1-liter flask with a 10-milliliter volumetric pipette, and was transferred into a Petri dish whose tare had been weighed. The Petri dish was loaded into an explosion-proof dryer and dried at 100° C. for 1.5 hours. After that, the Petri dish was left standing to cool for 30 minutes, and the total weight of the content and the Petri dish was weighed. The concentration of the PC-POS in the solution of the PC-POS in methylene chloride was measured as represented by the following equation.

Solid matter weight (g)=(total weight of content and Petri dish)−(Petri dish tare weight)

PCM concentration=[solid matter weight (g)]/[(10 mL×1.3 g/mL)×100]

As a result of the measurement, it was confirmed that the PCM concentrations of all Examples fell within the range of from 12 wt % to 15 wt %. The results are shown in Table 1-1 and Table 1-2.

<Measurement of PDMS Concentration and Mv of PC-POS Copolymer Flake>

After the PCM concentration measurement, the methylene chloride solution containing the PC-POS copolymer remaining in the 1-liter flask was concentrated with an evaporator and pulverized, and the PDMS concentration (y) and Mv of the resultant PC-POS copolymer flake were measured. The results are shown in Table 1-1 and Table 1-2.

<Judgment of Two-Layer Separation>

Judgment as to the presence or absence of two-layer separation was performed as described below. When a numerical value obtained by dividing a value, which was obtained by subtracting a PDMS amount (β) in the PC-POS copolymer flake from the PDMS amount (α) of the top portion of the organic phase in the cylindrical glass container after the 2.5 hours of standing, by the PDMS amount (13) in the PC-POS copolymer flake was 0.1 or less, the two-layer separation was judged to be absent. The results are collectively shown in Table 1-1 and Table 1-2.

Calculation equation for judgment as to presence or absence of two-layer separation: $((\alpha)-(\beta))/(\beta)$

TABLE 1-1

|  |  | Examples | | | | | |
|---|---|---|---|---|---|---|---|
|  |  | 1 | 2 | 3 | 4 | 5 | 6 |
| PCO | (1): mL | 273 | 242 | 212 | 273 | 242 | 182 |
| MC | (2): mL | 273 | 373 | 488 | 447 | 485 | 418 |
| PDMS | (3): chain length (n) | 61 | 61 | 61 | 91 | 91 | 91 |
|  | (4): g | 26 | 39 | 52 | 26 | 39 | 67 |
| TEA | (5): μL | 162 | 144 | 126 | 121 | 108 | 99 |
| 6.4 wt % aqueous NaOH | (6): g | 19.40 | 25.82 | 22.59 | 19.36 | 17.21 | 19.36 |
| PTBP | (7): g | 1.41 | 1.26 | 1.10 | 1.41 | 1.26 | 0.94 |
| MC | (8): mL | 17 | 15 | 13 | 15 | 17 | 11 |
| NaOH | (9): g | 10.22 | 9.09 | 8.00 | 10.20 | 9.09 | 6.82 |
| Na$_2$S$_2$O$_4$ | (10): g | 0.038 | 0.034 | 0.030 | 0.038 | 0.034 | 0.025 |
| Water | (11): mL | 150 | 133 | 116 | 150 | 133 | 100 |
| BPA | (12): g | 19.00 | 16.90 | 14.77 | 18.98 | 16.90 | 12.70 |
| MC | (13): mL | 180 | 100 | 30 | 0 | 0 | 100 |

TABLE 1-1-continued

|  |  |  |  |  |  |  |  |
|---|---|---|---|---|---|---|---|
| Polycarbonate oligomer solid content weight (x) | g/L | 165 | 130 | 100 | 125 | 110 | 100 |
| PDMS concentration (y) in PC-POS copolymer | mass % | 19 | 28 | 37 | 19 | 28 | 48 |
| Mv |  | 17,700 | 17,800 | 17,000 | 17,500 | 17,300 | 17,200 |
| PCM concentration | wt % | 14 | 14.1 | 13.5 | 14.1 | 13.5 | 14.3 |
| Value calculated by formula (1) |  | −28.04 | −3.23 | −5.04 | −11.58 | −4.68 | −6.38 |
| Value calculated by formula (2) |  | 1,159 | 1,647 | 2,257 | 2,548 | 2,548 | 4,368 |
| Result of judgment of two-layer separation in 2.5 hours |  | ≤0.1 | ≤0.1 | ≤0.1 | ≤0.1 | ≤0.1 | ≤0.1 |
| Judgment as to presence or absence of two-layer separation in 2.5 hours |  | Absent | Absent | Absent | Absent | Absent | Absent |

|  |  | Examples | | Comparative Examples | | | |
|---|---|---|---|---|---|---|---|
|  |  | 7 | 8 | 1 | 2 | 3 | 4 |
| PCO |  | 303 | 303 | 212 | 242 | 242 | 273 |
| MC |  | 303 | 303 | 212 | 158 | 291 | 273 |
| PDMS |  | 142 | 279 | 61 | 61 | 91 | 279 |
|  |  | 13 | 7.2 | 52 | 39 | 39 | 26 |
| TEA |  | 135 | 156 | 126 | 144 | 108 | 162 |
| 6.4 wt % aqueous NaOH |  | 21.52 | 21.52 | 22.59 | 25.82 | 17.21 | 29.05 |
| PTBP |  | 1.57 | 1.57 | 0.99 | 1.26 | 1.26 | 1.41 |
| MC |  | 18 | 18 | 12 | 15 | 15 | 17 |
| NaOH |  | 11.36 | 11.40 | 8.00 | 9.10 | 9.10 | 10.20 |
| Na$_2$S$_2$O$_4$ |  | 0.042 | 0.042 | 0.030 | 0.034 | 0.034 | 0.038 |
| Water |  | 166 | 166 | 116 | 133 | 133 | 150 |
| BPA |  | 21.10 | 21.09 | 14.77 | 16.87 | 16.87 | 18.98 |
| MC |  | 120 | 90 | 300 | 320 | 180 | 180 |
| Polycarbonate oligomer solid content weight (x) |  | 165 | 165 | 165 | 200 | 150 | 165 |
| PDMS concentration (y) in PC-POS copolymer |  | 11 | 5.9 | 38 | 34 | 30 | 20 |
| Mv |  | 17,300 | 17,700 | 18,500 | 18,000 | 17,900 | 17,900 |
| PCM concentration |  | 14 | 13.7 | 13.2 | 13.5 | 13.4 | 13.5 |
| Value calculated by formula (1) |  | −33.60 | −17.23 | 15.61 | 2.99 | 3.66 | 12.54 |
| Value calculated by formula (2) |  | 1,562 | 1,646 | 2,318 | 1,769 | 2,730 | 5,580 |
| Result of judgment of two-layer separation in 2.5 hours |  | ≤0.1 | ≤0.1 | 0.78 | 0.80 | 1.2 | 0.50 |
| Judgment as to presence or absence of two-layer separation in 2.5 hours |  | Absent | Absent | Present | Present | Present | Present |

TABLE 1-2

|  |  | Examples | | | | | |
|---|---|---|---|---|---|---|---|
|  |  | 9 | 10 | 11 | 12 | 13 | 14 |
| PCO | (1): mL | 227 | 227 | 227 | 227 | 227 | 227 |
| MC | (2): mL | 350 | 350 | 350 | 398 | 398 | 398 |
| PDMS | (3): chain length (n) | 61 | 61 | 61 | 91 | 91 | 91 |
|  | (4): g | 37 | 37 | 37 | 29 | 29 | 29 |
| TEA | (5): μL | 135 | 135 | 135 | 135 | 135 | 135 |
| 6.4 wt % aqueous NaOH | (6): g | 24.2 | 24.2 | 24.2 | 16.14 | 16.14 | 16.14 |
| PTBP | (7): g | 1.89 | 1.18 | 0.72 | 1.89 | 1.18 | 0.72 |
| MC | (8): mL | 22 | 14 | 8 | 22 | 22 | 22 |
| NaOH | (9): g | 8.5 | 8.5 | 8.5 | 8.5 | 8.5 | 8.5 |
| Na$_2$S$_2$O$_4$ | (10): g | 0.032 | 0.032 | 0.032 | 0.032 | 0.032 | 0.032 |
| Water | (11): mL | 125 | 125 | 125 | 125 | 125 | 125 |
| BPA | (12): g | 15.82 | 15.82 | 15.82 | 15.8 | 15.8 | 15.8 |
| MC | (13): mL | 100 | 100 | 100 | 20 | 20 | 20 |
| Polycarbonate oligomer solid content weight (x) | g/L | 130 | 130 | 130 | 120 | 120 | 120 |
| PDMS concentration (y) in PC-POS copolymer | mass % | 30 | 30 | 30 | 25 | 25 | 25 |
| Mv |  | 13,000 | 16,300 | 20,000 | 14,100 | 17,000 | 22,100 |
| PCM concentration | wt % | 12.6 | 13.0 | 13.3 | 13.5 | 13.4 | 13.7 |

TABLE 1-2-continued

|  | Examples | | | | | |
| --- | --- | --- | --- | --- | --- | --- |
|  | 9 | 10 | 11 | 12 | 13 | 14 |
| Value calculated by formula (1) | −1.02 | −1.02 | −1.02 | −5.19 | −5.19 | −5.19 |
| Value calculated by formula (2) | 1,830 | 1,830 | 1,830 | 2,250 | 2,250 | 2,250 |
| Result of judgment of two-layer separation in 2.5 hours | ≤0.1 | ≤0.1 | ≤0.1 | ≤0.1 | ≤0.1 | ≤0.1 |
| Judgment as to presence or absence of two-layer separation in 2.5 hours | Absent | Absent | Absent | Absent | Absent | Absent |

Production Examples 1 to 15 of Polycarbonate-Polyorganosiloxane Copolymer (A)

Values for the following (i) to (xiv) represent the amounts of respective components used in production examples, and are as shown in Table 2.

(i) L of the polycarbonate oligomer solution (PCO) produced as described above, (ii) L of methylene chloride (MC), a solution obtained by dissolving (iv) g of an allylphenol terminal-modified polydimethylsiloxane (a polydimethylsiloxane is hereinafter sometimes referred to as "PDMS") having an average chain length n of (iii) in (v) L of methylene chloride (MC), and (vi) mL of triethylamine (TEA) were loaded into a 50-liter vessel-type reactor including a baffle board, a paddle-type stirring blade, and a cooling jacket. (vii) g of 6.4 mass % aqueous sodium hydroxide (NaOHaq) was added to the mixture under stirring, and a reaction between the polycarbonate oligomer and the allylphenol terminal-modified PDMS was performed for 20 minutes (step (Q)).

A solution of p-t-butylphenol (PTBP) in methylene chloride (obtained by dissolving (viii) g of PTBP in (ix) L of methylene chloride (MC)) and a solution of BPA in aqueous sodium hydroxide (obtained by DISSOLVING (xiii) g of BPA in an aqueous solution obtained by dissolving (x) g of NaOH and (xi) g of sodium dithionite ($Na_2S_2O_4$) in (xii) L of water) were added to the polymerization liquid, and the mixture was subjected to a polymerization reaction for 40 minutes (main polymerization step).

(xiv) L of methylene chloride (MC) was added to the resultant for dilution, and the mixture was stirred for 10 minutes. After that, the mixture was separated into an organic phase containing a PC-POS copolymer, and an aqueous phase containing excess amounts of BPA and NaOH, and the organic phase was isolated.

A solution of the PC-POS in methylene chloride thus obtained was sequentially washed with 0.03 mol/L aqueous NaOH and 0.2 mol/L hydrochloric acid in amounts of 15 vol % each with respect to the solution. Next, the solution was repeatedly washed with pure water until an electric conductivity in an aqueous phase after the washing became 0.01 μS/m or less.

The solutions of the polycarbonates in methylene chloride obtained by the washing were concentrated and pulverized, and the resultant flakes were dried under reduced pressure at 120° C. The PDMS concentrations and viscosity-average molecular weights of the resultant flakes were measured. The results are shown in Table 2.

TABLE 2

|  | Production Examples | | | | | | | |
| --- | --- | --- | --- | --- | --- | --- | --- | --- |
|  | 1 | 2 | 3 | 4 | 5 | 6 | 7 | 8 |
| PC-POS (A) | A1 | A2 | A3 | A4 | A5 | A6 | A7 | A8 |
| (i) PCO (L) | 12 | 10 | 10 | 11 | 11 | 11 | 12 | 12 |
| (ii) MC (L) | 27.6 | 21.8 | 21.8 | 23.9 | 23.9 | 25.4 | 28 | 27.6 |
| (iii) PDMS chain length (n) | 61 | 61 | 61 | 91 | 91 | 142 | 279 | 61 |
| (iv) PDMS loading amount (g) | 1,150 | 1,650 | 2,500 | 1,050 | 1,800 | 450 | 305 | 500 |
| (v) MC (L) | 1 | 2 | 2 | 2 | 2 | 1 | 0.5 | 1 |
| (vi) TEA (mL) | 6.6 | 5.5 | 5.5 | 6.1 | 6.1 | 6 | 6.6 | 6.6 |
| (vii) NaOHaq (g) | 867 | 1,084 | 1,084 | 762 | 762 | 761 | 867 | 867 |
| (viii) PTBP (g) | 55.1 | 45.9 | 45.9 | 52.8 | 52.8 | 58.7 | 57.6 | 55.1 |
| (ix) MC (L) | 0.5 | 0.5 | 0.5 | 0.3 | 0.3 | 0.3 | 0.3 | 0.5 |
| (x) NaOH (g) | 444 | 370 | 370 | 400 | 400 | 395 | 437 | 444 |
| (xi) $Na_2S_2O_4$ (g) | 1.6 | 1.4 | 1.4 | 1.5 | 1.5 | 1.1 | 1.6 | 1.6 |
| (xii) Water (L) | 6.5 | 5.4 | 5.4 | 5.9 | 5.9 | 5.8 | 6.4 | 6.5 |
| (xiii) BPA (g) | 824 | 686 | 686 | 755 | 755 | 571 | 824 | 824 |
| (xiv) MC (L) | 0 | 6 | 6 | 3 | 3 | 4 | 1 | 0 |
| Mv | 17,700 | 17,300 | 17,100 | 17,900 | 18,100 | 18,000 | 17,800 | 17,700 |
| PDMS concentration (wt %) | 20 | 30 | 40 | 20 | 33 | 10 | 6 | 10 |

|  | Production Examples | | | | | | |
| --- | --- | --- | --- | --- | --- | --- | --- |
|  | 9 | 10 | 11 | 12 | 13 | 14 | 15 |
| PC-POS (A) | A9 | A10 | A11 | A12 | A13 | A14 | A15 |
| (i) PCO (L) | 12 | 15 | 6.0 | 6.0 | 8.0 | 11 | 8.0 |
| (ii) MC (L) | 27.3 | 8.6 | 12.5 | 12.5 | 16.5 | 23.9 | 16.5 |
| (iii) PDMS chain length (n) | 91 | 91 | 61 | 61 | 91 | 91 | 91 |

TABLE 2-continued

|  |  |  |  |  |  |  |  |
|---|---|---|---|---|---|---|---|
| (iv) PDMS loading amount (g) | 520 | 390 | 970 | 970 | 1,050 | 1,400 | 1,050 |
| (v) MC (L) | 1 | 0.5 | 2 | 2 | 2 | 2 | 2 |
| (vi) TEA (mL) | 6.6 | 9.2 | 3.4 | 3.4 | 4.4 | 6.1 | 4.4 |
| (vii) NaOHaq (g) | 867 | 1,193 | 761 | 761 | 545 | 762 | 545 |
| (viii) PTBP (g) | 57.6 | 71.1 | 40.4 | 15.6 | 64.2 | 52.8 | 21.8 |
| (ix) MC (L) | 0.3 | 0.3 | 500 | 500 | 500 | 300 | 500 |
| (x) NaOH (g) | 437 | 605 | 225 | 225 | 291 | 400 | 291 |
| (xi) $Na_2S_2O_4$ (g) | 1.6 | 2.3 | 0.7 | 0.8 | 1.1 | 1.5 | 1.1 |
| (xii) Water (L) | 6.4 | 8.8 | 3.3 | 3.3 | 4.3 | 5.9 | 4.3 |
| (xiii) BPA (g) | 824 | 1,140 | 350 | 378 | 549 | 755 | 549 |
| (xiv) MC (L) | 0 | 14 | 5 | 10 | 5 | 0 | 10 |
| Mv | 17,300 | 17,300 | 15,000 | 21,200 | 14,000 | 17,800 | 21,900 |
| PDMS concentration (wt %) | 13 | 6 | 29 | 29 | 25 | 25 | 25 |

Reference Examples 1 to 30

Anyone of the PC-POS copolymers A1 to A15 obtained in Production Examples 1 to 15, and other respective components were mixed at blending ratios shown in Table 3-1 to Table 3-3, and the mixture was supplied to a vented twin-screw extruder (manufactured by Toshiba Machine Co., Ltd., TEM-35B) and melt-kneaded at a screw revolution number of 150 rpm, an ejection amount of 20 kg/hr, and a resin temperature of from 295° C. to 300° C. to provide an evaluation pellet sample. The results of physical property evaluation tests are shown in Table 3-1, Table 3-2, and Table 3-3.

TABLE 3-1

| | | | Reference Examples | | | | | | | | | |
|---|---|---|---|---|---|---|---|---|---|---|---|---|
| | | | 1 | 2 | 3 | 4 | 5 | 6 | 7 | 8 | 9 | 10 |
| Resin composition | | | R1 | R2 | R3 | R4 | R5 | R6 | R7 | R8 | R9 | R10 |
| Blended compo- nent (parts by mass) | PC- POS (A) | A1 | 12.0 | | | | | | | | | |
| | | A2 | | 8.0 | | | | | | | | |
| | | A3 | | | 6.0 | | | | | | | |
| | | A4 | | | | 12.0 | | | | | | |
| | | A5 | | | | | 7.3 | | | | | |
| | | A6 | | | | | | 24.0 | | | | |
| | | A7 | | | | | | | 40.0 | | | |
| | | A8 | | | | | | | | 24.0 | | |
| | | A9 | | | | | | | | | 18.5 | |
| | | A10 | | | | | | | | | | 40.0 |
| | Polycarbonate-based resin (B)* | | 88.0 | 92.0 | 94.0 | 88.0 | 92.7 | 76.0 | 60.0 | 76.0 | 81.5 | 60.0 |
| | Antioxidant** | | 0.05 | 0.05 | 0.05 | 0.05 | 0.05 | 0.05 | 0.05 | 0.05 | 0.05 | 0.05 |
| | PDMS concentra- tion (mass %) (y') | | 2.4 | 2.4 | 2.4 | 2.4 | 2.4 | 2.4 | 2.4 | 2.4 | 2.4 | 2.4 |
| Evalua- tion result | Mv | | 17,700 | 17,700 | 17,600 | 17,600 | 17,400 | 17,700 | 17,500 | 17,700 | 17,500 | 17,400 |
| | MFR (g/10 min) | | 19 | 20 | 21 | 23 | 23 | 20 | 24 | 19 | 22 | 21 |
| | Q value ($\times 10^{-2}$ mL/sec) | | 12.1 | 13 | 13 | 13 | 14 | 12.1 | 14 | 12 | 13 | 13 |
| | Notched Izod impact strength (kJ/m$^2$) at −40° C. | | 52 | 54 | 52 | 52 | 57 | 55 | 55 | 22 | 30 | 29 |
| | Notched Izod impact strength (kJ/m$^2$) at −30° C. | | 61 | 58 | 59 | 64 | 61 | 64 | 61 | 50 | 64 | 61 |
| | Notched Izod impact strength (kJ/m$^2$) at 23° C. | | 76 | no data | no data | 75 | 72 | no data | no data | no data | 77 | 76 |

*Polycarbonate-based resin: [manufactured by Idemitsu Kosan Co., Ltd., TARFLON FN1700 (product name), viscosity-average molecular weight = 17,700]

**Antioxidant: "IRGAFOS 168 (product name)" [tris(2,4-di-t-butylphenyl) phosphite, manufactured by BASF Japan]

TABLE 3-2

| | | | Reference Example | | | | | | | | | |
|---|---|---|---|---|---|---|---|---|---|---|---|---|
| | | | 11 | 12 | 13 | 14 | 15 | 16 | 17 | 18 | 19 | 20 |
| Resin composition | | | R11 | R12 | R13 | R14 | R15 | R16 | R17 | R18 | R19 | R20 |
| Blended component (A) (parts by mass) | PC-POS (A) | A1 | 8.0 | | | | | | | | | |
| | | A2 | | 5.3 | | | | | | | | |
| | | A3 | | | 4.0 | | | | | | | |
| | | A4 | | | | 8.0 | | | | | | |
| | | A5 | | | | | 5.3 | | | | | |
| | | A6 | | | | | | 16.0 | | | | |
| | | A7 | | | | | | | 26.7 | | | |
| | | A8 | | | | | | | | 16.0 | | |
| | | A9 | | | | | | | | | 12.3 | |
| | | A10 | | | | | | | | | | 26.7 |
| | Polycarbonate-based resin (B)* | | 92.0 | 94.7 | 96.0 | 92.0 | 94.7 | 84.0 | 73.3 | 84.0 | 87.7 | 73.3 |
| | Antioxidant** | | 0.05 | 0.05 | 0.05 | 0.05 | 0.05 | 0.05 | 0.05 | 0.05 | 0.05 | 0.05 |
| | PDMS concentration (mass %) (y') | | 1.6 | 1.6 | 1.6 | 1.6 | 1.6 | 1.6 | 1.6 | 1.6 | 1.6 | 1.6 |
| Evaluation result | Mv | | 17,700 | 17,700 | 18,200 | 17,300 | 17,400 | 17,700 | 17,400 | 17,900 | 17,300 | 17,500 |
| | MFR (g/10 min) | | 21 | 22 | 22 | 25 | 25 | 22 | 25 | 21 | 25 | 26 |
| | Q value ($\times 10^{-2}$ mL/sec) | | 12 | 13 | 13 | 14 | 14 | 12 | 14 | 12 | 14 | 14 |
| | Notched Izod impact strength (kJ/m$^2$) at −40° C. | | 25 | 27 | 24 | 24 | 26 | 23 | 27 | 21 | 20 | 22 |
| | Notched Izod impact strength (kJ/m$^2$) at −30° C. | | 56 | 58 | 57 | 36 | 37 | 52 | 57 | 27 | 25 | 23 |
| | Notched Izod impact strength (kJ/m$^2$) at 23° C. | | no data | no data | no data | 75 | 73 | no data | no data | no data | 75 | 75 |

*Polycarbonate-based resin: [manufactured by Idemitsu Kosan Co., Ltd., TARFLON FN1700 (product name), viscosity-average molecular weight = 17,700]
**Antioxidant: "IRGAFOS 168 (product name)" [tris(2,4-di-t-butylphenyl) phosphite, manufactured by BASF Japan]

TABLE 3-3

| | | | Reference Example | | | | | | | | | |
|---|---|---|---|---|---|---|---|---|---|---|---|---|
| | | | 21 | 22 | 23 | 24 | 25 | 26 | 27 | 28 | 29 | 30 |
| Resin composition | | | R21 | R22 | R23 | R24 | R25 | R26 | R27 | R28 | R29 | R30 |
| Blended component (A) (parts by mass) | PC-POS (A) | A11 | 8.3 | | | | | 5.5 | | | | |
| | | A12 | | 8.3 | | | | | 5.5 | | | |
| | | A13 | | | 9.6 | | | | | 6.4 | | |
| | | A14 | | | | 9.6 | | | | | 6.4 | |
| | | A15 | | | | | 9.5 | | | | | 6.4 |
| | Polycarbonate-based resin (B1)* | | | 11.0 | | 2.7 | 14.5 | | 7.6 | | 2.8 | 10.3 |
| | Polycarbonate-based resin (B2)* | | 87.1 | 80.7 | 82.3 | 87.7 | 76.0 | 92.6 | 86.9 | 88.9 | 90.8 | 83.3 |
| | Polycarbonate-based resin (B3)* | | 4.6 | | 8.1 | | | 1.9 | | 4.7 | | |
| | Antioxidant** | | 0.05 | 0.05 | 0.05 | 0.05 | 0.05 | 0.05 | 0.05 | 0.05 | 0.05 | 0.05 |
| | PDMS concentration (mass %) (y') | | 2.4 | 2.4 | 2.4 | 2.4 | 2.4 | 1.6 | 1.6 | 1.6 | 1.6 | 1.6 |
| | Mv of PC-POS (A) | | 15,000 | 21,200 | 14,000 | 17,800 | 21,900 | 15,000 | 21,200 | 14,000 | 17,800 | 21,900 |
| Evaluation result | Mv | | 17,600 | 17,500 | 17,700 | 17,600 | 17,500 | 17,400 | 17,500 | 17,600 | 17,300 | 17,700 |
| | MFR (g/10 min) | | 21 | 21 | 21 | 21 | 21 | 23 | 22 | 23 | 23 | 22 |
| | Q value ($\times 10^{-2}$ mL/sec) | | 13 | 13 | 13 | 13 | 13 | 13 | 13 | 13 | 13 | 13 |
| | Notched Izod impact strength (kJ/m$^2$) at −40° C. | | 37 | 62 | 54 | 60 | 57 | no data | no data | 26 | 26 | 24 |
| | Notched Izod impact strength (kJ/m$^2$) at −30° C. | | 65 | 66 | 64 | 65 | 63 | 33 | 62 | 41 | 57 | 35 |

TABLE 3-3-continued

|  | Reference Example | | | | | | | | | |
|---|---|---|---|---|---|---|---|---|---|---|
|  | 21 | 22 | 23 | 24 | 25 | 26 | 27 | 28 | 29 | 30 |
| Notched Izod impact strength (kJ/m$^2$) at 23° C. | no data | no data | no data | no data | no data | no data | no data | no data | no data | no data |

*Polycarbonate-based resin:
B1: [manufactured by Idemitsu Kosan Co., Ltd., TARFLON FN1500 (product name), viscosity-average molecular weight = 14,200]
B2: [manufactured by Idemitsu Kosan Co., Ltd., TARFLON FN1700 (product name), viscosity-average molecular weight = 17,700]
B3: [manufactured by Idemitsu Kosan Co., Ltd., TARFLON FN2200 (product name), viscosity-average molecular weight = 21,300]
**Antioxidant: "IRGAFOS 168 (product name)" [tris(2,4-di-t-butylphenyl) phosphite, manufactured by BASF Japan]

[Evaluation Test]
<Izod Impact Strength>

The resultant pellet was dried at 120° C. for 8 hours. After that, the dried product was subjected to injection molding with an injection molding machine (manufactured by Nissei Plastic Industrial Co., Ltd., NEX 110, screw diameter: 36 mmφ) at a cylinder temperature of 280° C. and a mold temperature of 80° C. to produce an Izod test piece (measuring 63 mm by 13 mm by 3.2 mm). Notched Izod impact strengths at −40° C. and −30° C., and, in some cases, 23° C. were measured by using a test piece obtained by making a notch in the test piece through post-processing in conformity with the ASTM standard D-256.

<Fluidity Evaluation> (MFR)

The amount (g/10 min) of a molten resin flowing out of a die having a diameter of 2 mm and a length of 8 mm was measured by using the above-mentioned pellet in conformity with JIS K 7210 at 300° C. under a load of 1.2 kg.

<Q Value (Flow Value) [Unit; 10$^{-2}$ mL/Sec]>

The amount (mL/sec) of a molten resin flowing out of a nozzle having a diameter of 1 mm and a length of 10 mm was measured by using the above-mentioned pellet and a Koka flow tester inconformity with JIS K 7210 at 280° C. under a pressure of 15.9 MPa. A Q value represents an outflow amount per unit time, and a higher numerical value therefor means that the fluidity of the resin is better.

Reference Examples 31 to 38

Notched Izod test pieces were produced by using the resin compositions R2, R5, R7, and R10 (Table 4-1) obtained by the above-mentioned reference examples, and resin compositions R31 to R34 obtained by formulations shown in Table 4-2, and their notch portions were subjected to painting. After the painting, an Izod impact test was performed. The Izod impact test values of painted test pieces and unpainted test pieces are shown in Table 4-1 and Table 4-2.

<Painting to Izod Test Piece>

A portion except the notch surface of each of the notched Izod test pieces was masked with a masking tape, and the notch surface was degreased with isopropyl alcohol. After that, a paint prepared by blending HAIUREX P GRANDE BONUL GPX79 SILVER (manufactured by Musashi Paint Co., Ltd.), a curing agent H-250 (manufactured by ALAsia Chemical), and an ester-based thinner at a ratio of 10:1:10 was painted on the notch surface of each of the Izod test pieces so that a painted film had a thickness of 9±1 μm. Drying conditions were as follows: the paint was dried at 80° C. for 30 minutes, and was then dried at room temperature for 5 days.

TABLE 4-1

|  | Reference Examples | | | |
|---|---|---|---|---|
|  | 31 | 32 | 33 | 34 |
| Resin composition | R2 | R5 | R7 | R10 |
| PDMS concentration (mass %) (y') | 2.4 | 2.4 | 2.4 | 2.4 |
| Notched Izod impact strength (kJ/m$^2$) at −30° C. before painting | 58 | 62 | 62 | 61 |
| Notched Izod impact strength (kJ/m$^2$) at −30° C. after painting | 42 | 47 | 43 | 22 |
| Izod impact strength retention rate (%) at −30° C. | 71 | 75 | 70 | 37 |

TABLE 4-2

|  |  |  | Reference Examples | | | |
|---|---|---|---|---|---|---|
|  |  |  | 35 | 36 | 37 | 38 |
|  | Resin composition |  | R21 | R22 | R23 | R24 |
| Blended component (parts by mass) | PC-POS (A) | A2 | 11 |  |  |  |
|  |  | A5 |  | 10 |  |  |
|  |  | A7 |  |  | 53 |  |
|  |  | A10 |  |  |  | 53 |
|  | Polycarbonate-based resin (B)* |  | 89 | 90 | 47 | 47 |
|  | Antioxidant** |  | 0.05 | 0.05 | 0.05 | 0.05 |
|  | PDMS concentration (mass %) (y') |  | 3.2 | 3.2 | 3.2 | 3.2 |
| Evaluation result | Mv |  | 17,700 | 17,400 | 17,300 | 17,400 |
|  | MFR (g/10 min) |  | 18 | 21 | 24 | 19 |
|  | Q value (×10$^{-2}$ mL/sec) |  | 13 | 14 | 14 | 13 |
|  | Notched Izod impact strength (kJ/m$^2$) at −40° C. before painting |  | 58 | 59 | 55 | 57 |
|  | Notched Izod impact strength (kJ/m$^2$) at −40° C. after painting |  | 49 | 42 | 38 | 19 |

TABLE 4-2-continued

|  | Reference Examples | | | |
|---|---|---|---|---|
|  | 35 | 36 | 37 | 38 |
| Izod impact strength retention rate (%) at −40° C. | 84 | 71 | 69 | 33 |

*Polycarbonate-based resin: [manufactured by Idemitsu Kosan Co., Ltd., TARFLON FN1700 (product name), viscosity-average molecular weight = 17,700]
**Antioxidant: "IRGAFOS 168 (product name)" [tris(2,4-di-t-butylphenyl) phosphite, manufactured by BASF Japan]

As can be seen from Examples 1 to 14, when the solid content weight (x) of the polycarbonate oligomer in 1 L of the mixed solution of the organic solvent and the polycarbonate oligomer, the concentration (y) of the polyorganosiloxane in the polycarbonate-polyorganosiloxane copolymer, and the chain length (n) of the polyorganosiloxane satisfy any one of the above-mentioned conditions (I-I) to (IV-I), no two-layer separation occurs.

Comparison between Reference Examples 1 to 7 and Reference Examples 8 to 10, and comparison between Reference Examples 11 to 17 and Reference Examples 18 to 20 show the following: in each of Reference Examples 1 to 7 and 11 to 17 in which a polycarbonate-polyorganosiloxane copolymer having a large polyorganosiloxane block content or a long polyorganosiloxane chain length is mixed with any other polycarbonate-based resin, low-temperature impact resistance more excellent than that of each of Reference Examples 8 to 10 and Reference Examples 18 to 20 in which a polycarbonate-polyorganosiloxane copolymer having a small polyorganosiloxane block content is mixed with any other polycarbonate-based resin is obtained even though these reference examples are comparable to each other in polyorganosiloxane content in the final polycarbonate-based resin composition.

Comparison between Reference Examples 21 and 22, and comparison between Reference Examples 26 and 27 show that even though these reference examples are comparable to each other in viscosity-average molecular weight (Mv) and polyorganosiloxane content of a resin composition, particularly excellent low-temperature impact resistance is obtained by using the polycarbonate-polyorganosiloxane copolymer (A) having a high viscosity-average molecular weight in the resin composition. Comparison among Reference Examples 23 to 25, and comparison among Reference Examples 28 to 30 show that even in the above-mentioned case, a simple increase in viscosity-average molecular weight of the polycarbonate-polyorganosiloxane copolymer is not sufficient to obtain excellent low-temperature impact resistance, and an optimum range for the viscosity-average molecular weight exists.

Comparison between Reference Examples 31 to 33 and Reference Example 34, and comparison between Reference Examples 35 to 37 and Reference Example 38 show the following: in each of Reference Examples 31 to 33 and 35 to 37 in which a polycarbonate-polyorganosiloxane copolymer having a large polyorganosiloxane block content or a long polyorganosiloxane chain length is mixed with any other polycarbonate-based resin, the rate at which the impact strength of a test piece molded out of a resin composition is retained after the test piece has been subjected to painting as compared to that before the painting is more excellent than those of Reference Example 34 and Reference Example 38 in which a polycarbonate-polyorganosiloxane copolymer having a small polyorganosiloxane block content is mixed with any other polycarbonate-based resin even though these reference examples are comparable to each other in polyorganosiloxane content in the final polycarbonate-based resin composition.

INDUSTRIAL APPLICABILITY

According to the present invention, at the time of the production of the polycarbonate-polyorganosiloxane copolymer, in the step of causing a polycarbonate oligomer and at least one kind of raw material polyorganosiloxane to react with each other in an organic solvent, specific conditions concerning the solid content weight of the polycarbonate oligomer in 1 L of a mixed solution of the organic solvent and the polycarbonate oligomer, the concentration of the polyorganosiloxane in the polycarbonate-polyorganosiloxane copolymer, and the chain length of the polyorganosiloxane are satisfied, and hence the polycarbonate-polyorganosiloxane copolymer having a large polyorganosiloxane block content can be stably produced.

The invention claimed is:

1. A method of producing a polycarbonate-polyorganosiloxane copolymer, comprising a step (Q) of causing a polycarbonate oligomer and at least one of polyorganosiloxanes represented by the following general formulae (i) to (iii) to react with each other in an organic solvent, wherein in the step, a solid content weight x (g/L) of the polycarbonate oligomer in 1 L of a mixed solution of the organic solvent and the polycarbonate oligomer, a concentration y (mass %) of the polyorganosiloxane in the polycarbonate-polyorganosiloxane copolymer to be obtained, and a chain length n of the polyorganosiloxane satisfy any one of conditions described by following formulae (I-I), (I-II), (I-III), (II-I), (II-II), (II-III), (III-I), and (IV-I):

$$36 \leq n < 75, 15 \leq y < 26, 80 \leq x < 190, \quad \text{(I-I)}$$

$$36 \leq n < 75, 26 \leq y \leq 35, 80 \leq x \leq 170, \quad \text{(I-II)}$$

$$36 \leq n < 75, 35 < y \leq 50, 80 \leq x \leq 130, \quad \text{(I-III)}$$

$$75 \leq n \leq 110, 10 \leq y < 20, 80 \leq x \leq 190, \quad \text{(II-I)}$$

$$75 \leq n \leq 110, 20 \leq y \leq 30, 80 \leq x \leq 145, \quad \text{(II-II)}$$

$$75 \leq n \leq 110, 30 < y \leq 50, 80 \leq x \leq 130, \quad \text{(II-III)}$$

$$110 < n \leq 200, 5 \leq y \leq 15, 130 \leq x \leq 185, \quad \text{(III-I)}$$

$$200 < n \leq 350, 5 \leq y \leq 10, 130 \leq x \leq 185 \quad \text{(IV-I)}$$

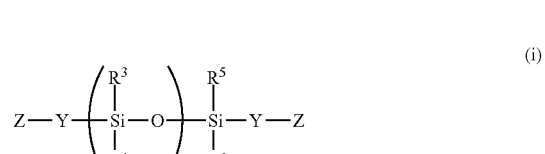

(i)

-continued (ii)

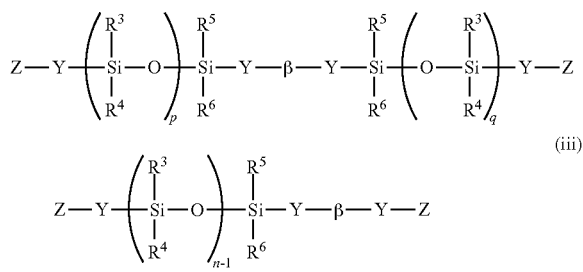

(iii)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, Z represents a hydrogen atom or a halogen atom, and a plurality of Z may be identical to or different from each other, β represents a divalent group derived from a diisocyanate compound, or a divalent group derived from a dicarboxylic acid or a halide of a dicarboxylic acid, n represents the chain length of the polyorganosiloxane, and n−1, and p and q each represent a number of repetitions of a polyorganosiloxane unit and each represent an integer of 1 or more, and a sum of p and q is n−2.

2. The method of producing a polycarbonate-polyorganosiloxane copolymer according to claim 1, wherein in the step (Q), the solid content weight x (g/L) of the polycarbonate oligomer in 1 L of the mixed solution of the organic solvent and the polycarbonate oligomer, the concentration y (mass %) of the polyorganosiloxane in the polycarbonate-polyorganosiloxane copolymer to be obtained, and the chain length n of the polyorganosiloxane satisfy the following mathematical formula (1)

$$-2.0 \times 10^{-5} x^3 + 1.1 \times 10^{-5} nx^2 + 1.5 \times 10^{-4} yx^2 - 6.0 \times 10^{-7} n^2 x - 1.6 \times 10^{-4} y^2 x - 2.8 \times 10^{-5} nyx - 18.8 \leq 0 \quad (1).$$

3. The method of producing a polycarbonate-polyorganosiloxane copolymer according to claim 1, wherein in the step (Q), the chain length n of the polyorganosiloxane and the concentration y (mass %) of the polyorganosiloxane in the polycarbonate-polyorganosiloxane copolymer to be obtained satisfy the following mathematical formula (2)

$$n \times y \geq 1100 \quad (2).$$

4. The method of producing a polycarbonate-polyorganosiloxane copolymer according to claim 1, wherein the polycarbonate oligomer has a weight-average molecular weight of from 1,500 to 2,900.

5. The method of producing a polycarbonate-polyorganosiloxane copolymer according to claim 1, wherein the step (Q) comprises adding a polymerization catalyst so that a molar ratio of the polymerization catalyst to a chloroformate is 0.001 or more to 0.02 or less.

6. The method of producing a polycarbonate-polyorganosiloxane copolymer according to claim 1, wherein the step (Q) comprises adding aqueous sodium hydroxide so that a molar ratio of sodium hydroxide to a chloroformate is 0.10 or more to 0.75 or less.

7. The method of producing a polycarbonate-polyorganosiloxane copolymer according to claim 1, wherein the method comprises further adding a dihydric phenol after the step (Q).

8. The method of producing a polycarbonate-polyorganosiloxane copolymer according to claim 1, wherein the method comprises performing a polymerization reaction after the step (Q) while keeping a temperature at from 20° C. to 40° C.

9. The method of producing a polycarbonate-polyorganosiloxane copolymer according to claim 1, wherein the polycarbonate-polyorganosiloxane copolymer to be obtained has a viscosity-average molecular weight of from 9,000 to 50,000.

10. A method of producing a polycarbonate-based resin composition, comprising mixing a polycarbonate-polyorganosiloxane copolymer (A) obtained by the production method of claim 1 and a polycarbonate-based resin (B) except the polycarbonate-polyorganosiloxane copolymer (A).

11. The method of producing a polycarbonate-based resin composition according to claim 10, wherein a weight ratio "(A)/(B)" of the polycarbonate-polyorganosiloxane copolymer (A) to the polycarbonate-based resin (B) is from 1/99 to 83/17.

12. The method of producing a polycarbonate-based resin composition according to claim 10, wherein the polycarbonate-based resin composition to be obtained has a viscosity-average molecular weight of from 9,000 to 50,000.

13. The method of producing a polycarbonate-based resin composition according to claim 10, wherein a polyorganosiloxane chain length (n) and a polyorganosiloxane concentration (y') (mass %) in the resin composition satisfy the following mathematical formula (3)

$$n \times y' \leq 1000 \quad (3).$$

14. The method of producing a polycarbonate-based resin composition according to claim 10, wherein the polycarbonate-based resin (B) comprises an aromatic homopolycarbonate.

* * * * *

UNITED STATES PATENT AND TRADEMARK OFFICE
CERTIFICATE OF CORRECTION

PATENT NO.       : 10,472,518 B2
APPLICATION NO.  : 15/754776
DATED            : November 12, 2019
INVENTOR(S)      : Tomoko Abe et al.

Page 1 of 3

It is certified that error appears in the above-identified patent and that said Letters Patent is hereby corrected as shown below:

In the Claims

Claim 1, Column 38, Lines 45-60:
Please delete:

"  $36 \leq n < 75, 15 \leq y < 26, 80 \leq x < 190,$           (I-I):

$36 \leq n < 75, 26 \leq y \leq 35, 80 \leq x \leq 170,$      (I-II):

$36 \leq n < 75, 35 < y \leq 50, 80 \leq x \leq 130,$         (I-III):

$75 \leq n \leq 110, 10 \leq y < 20, 80 \leq x \leq 190,$     (II-I):

$75 \leq n \leq 110, 20 \leq y \leq 30, 80 \leq x \leq 145,$  (II-II):

$75 \leq n \leq 110, 30 < y \leq 50, 80 \leq x \leq 130,$     (II-III):

$110 < n \leq 200, 5 \leq y \leq 15, 130 \leq x \leq 185,$    (III-I):

$200 < n \leq 350, 5 \leq y \leq 10, 130 \leq x \leq 185$     (IV-I): ,,

Signed and Sealed this
Twenty-fifth Day of February, 2020

Andrei Iancu
*Director of the United States Patent and Trademark Office*

Please replace with:
(I-I): 36≤n<75, 15≤y<26, 80≤x≤190, (I-II): 36≤n<75, 26≤y≤35, 80≤x≤170, (I-III): 36≤n<75, 35<y≤50, 80≤x≤130, (II-I): 75≤n≤110, 10≤y<20, 80≤x≤190, (II-II): 75≤n≤110, 20≤y≤30, 80≤x≤145, (II-III): 75≤n≤110, 30<y≤50, 80≤x≤130, (III-I): 110<n≤200, 5≤y≤15, 130≤x≤185, (IV-I): 200<n≤350, 5≤y≤10, 130≤x≤185

Claim 2, Column 39, Lines 50-53:
Please delete:
"satisfy the following mathematical formula (1)
$$-2.0 \times 10^{-5} x^3 + 1.1 \times 10^{-5} nx^2 + 1.5 \times 10^{-4} yx^2 - 6.0 \times 10^{-7} n^2 x - 1.6 \times 10^{-4} y^2 x - 2.8 \times 10^{-5} nyx - 18.8 \leq 0 \quad (1).$$"

Please replace with:
satisfy the following mathematical formula (1).
$$-2.0 \times 10^{-5} x^3 + 1.1 \times 10^{-5} nx^2 + 1.5 \times 10^{-4} yx^2 - 6.0 \times 10^{-7} n^2 x - 1.6 \times 10^{-4} y^2 x - 2.8 \times 10^{-5} nyx - 18.8 \leq 0 \quad \cdots (1)$$

Claim 3, Column 40, Lines 1-3:
Please delete:
"obtained satisfy the following mathematical formula (2)
$n \times y \geq 1100$                              (2)."

Please replace with:
obtained satisfy the following mathematical formula (2).
$n \times y \geq 1100 \cdots (2)$ Claim 13, Column 40, Lines 50-52:
Please delete:
"following mathematical formula (3)
$n \times y' \leq 1000$                              (3)."

Please replace with:
following mathematical formula (3).
$n \times y' \leq 1000 \cdots (3)$